(12) United States Patent
Reichental et al.

(10) Patent No.: US 11,003,805 B2
(45) Date of Patent: May 11, 2021

(54) COGNITIVE SYSTEM FOR COMPUTER AIDED DESIGN

(71) Applicant: ParaMatters Inc., Irvine, CA (US)

(72) Inventors: Avi N. Reichental, Carpenteria, CA (US); Sergei Azernikov, Irvine, CA (US); Michael Bogomolny, Irvine, CA (US)

(73) Assignee: ParaMatters Inc., Irvine, CA (US)

( * ) Notice: Subject to any disclaimer, the term of this patent is extended or adjusted under 35 U.S.C. 154(b) by 63 days.

(21) Appl. No.: 15/944,040

(22) Filed: Apr. 3, 2018

(65) Prior Publication Data

US 2018/0285517 A1    Oct. 4, 2018

Related U.S. Application Data

(60) Provisional application No. 62/481,441, filed on Apr. 4, 2017.

(51) Int. Cl.
| | | |
|---|---|---|
| *G06F 30/17* | (2020.01) | |
| *G06F 3/0481* | (2013.01) | |
| *G06F 111/20* | (2020.01) | |
| *G06F 119/18* | (2020.01) | |
| *G06F 111/02* | (2020.01) | |

(52) U.S. Cl.
CPC .......... *G06F 30/17* (2020.01); *G06F 3/04815* (2013.01); *G06F 2111/02* (2020.01); *G06F 2111/20* (2020.01); *G06F 2119/18* (2020.01); *Y02P 90/02* (2015.11)

(58) Field of Classification Search
CPC ............. G06F 17/5086; G06F 3/04815; G06F 2217/02; G06F 2217/04; G06F 2217/12; G06F 30/17; Y02P 90/265

USPC ........................................................... 703/7
See application file for complete search history.

(56) References Cited

U.S. PATENT DOCUMENTS

| | | | | |
|---|---|---|---|---|
| 6,202,043 B1* | 3/2001 | Devoino | ................. | G06F 30/20 |
| | | | | 703/17 |
| 10,235,009 B1* | 3/2019 | Jacobs, II | ............... | G06F 17/50 |
| 2006/0276925 A1 | 12/2006 | Lin et al. | | |

(Continued)

OTHER PUBLICATIONS

MDME: Manufacturing, Design, Mechanical Engineering, "Frame Analysis", 2016, LearnEasy, p. 1-26 (Year: 2016).*

(Continued)

*Primary Examiner* — Andre Pierre Louis
*Assistant Examiner* — Faraj Ayoub
(74) *Attorney, Agent, or Firm* — Ascenda Law Group, PC

(57) ABSTRACT

A computer-aided design (CAD) model of an article for manufacture, together with user problem definition input including materials, constraints, load conditions, preferred manufacturing processes, etc. for an optimized design of the article or material microstructure are received via a prompt-and-response graphical user interface. Based on this information, one or more routines to iteratively optimize material distribution within said article or the material microstructure design are executed in order to achieve best performance for materials, loads, and constraints specified by the user. At the completion of the optimization process, the user is presented the optimized design in a CAD file describing the optimized design of the article for the preferred manufacturing process or a newly designed material microstructure, as appropriate.

12 Claims, 21 Drawing Sheets

(56) References Cited

U.S. PATENT DOCUMENTS

| | | | |
|---|---|---|---|
| 2015/0269282 A1* | 9/2015 | Nelaturi | G06F 30/17 700/98 |
| 2016/0096318 A1 | 4/2016 | Bickel et al. | |
| 2016/0147217 A1* | 5/2016 | Davis | G06F 16/444 700/97 |
| 2019/0001657 A1* | 1/2019 | Matusik | B29C 64/386 |

OTHER PUBLICATIONS

Park et al, "Structural optimization based on CAD-CAE integration and metamodeling techniques", 2010, Elsevier Computer Aided Design 42 (Year: 2010).*

Krishnamoorthi etal, "Web Application for Size and Topology Optimization of Trusses and Gusset Plates", Dec. 2015, Structural Engineering and Mechanics, p. 1-17, "Krishna" (Year: 2015).*

Krishnamoorthi; et al., "Web application for size and topology optimization of trusses and gusset plates", Structural Engineering and Mechanics (Dec. 10, 2015), retrieved Jun. 7, 2018 from the Internet:URL: https://arxiv.org.pdf/1512.02881.pdf, 17 pages.

Sivapuram; et al., "Simultaneous material and structural optimization by multiscale topology optimization", Structural and Mutidisciplinary Optimization (Jul. 1, 2016), Research Paper, 54(5):1267-1281.

Suresh, "Topology Optimization on the Cloud: A Confluence of Technologies", Proceedings of the ASME 2015 International Design Engineering Technical Conferences & Computers and Information in Engineering Conference (Aug. 2-5, 2015), DETC2015-466137, 10 pages.

Topology optimization on the cloud: "CloudTopopt (Part 2)", YouTube, Nov. 16, 2014, retrieved Jun. 6, 2018 from the Internet: URL: https://www.youtube.com/watch?v=3iZGVFiPJ5Y, 1 page.

"ParaMatters—Making Your Ideas Matter", YouTube, Feb. 7, 2018, retrieved Jun. 6, 2018 from the Internet: URL: https://www.youtube.com/watch?v=o7AnIJDC4zw, 1 page.

International Search Report and Written Opinion dated Oct. 8, 2018, from the ISA/European Patent Office, for International Patent Application No. PCT/US2018/025837 (filed Apr. 3, 2018), 29 pages.

Amir; et al., "Topology Optimization for Conceptual Design of Reinforced Concrete Structures", 9th World Congress on Structural and Multidisciplinary Optimization (Jun. 13-17, 2010), Shizuoka, Japan, 10 pages.

Bradner; et al., "Parameters Tell the Design Story: Ideation and Abstraction in Design Optimization", Symposium on Simulation for Architecture and Urban Design, Sim AUD 2014, 8 pages.

Cheong; et al., "Investigating the Use of Controlled Natural Language as Problem Definition Input for Computer-Aided Design", International Conference on Innovative Design and Manufacturing (Aug. 13-15, 2014), Montreal, Quebec, Canada, 6 pages.

Cheong; et al., "Natural Language Problem Definition for Computer-Aided Mechanical Design", ACM SIGCHI Workshop (2014), 4 pages.

Liu; et al., "An efficient 3D topology optimization code written in Matlab", Struct Multidisc Optim (2014), 50:1175-1196.

Zhou; et al., "Topology Optimization for Additive Manufacturing Considering Cost of Support", presented at 12th World Congress on Computational Mechanics (WCCM XII) (Jul. 24-29, 2016, Seoul, Korea), 1 page.

International Preliminary Report on Patentability dated Aug. 12, 2019, from the IPEA/US, for International Patent Application No. PCT/US2018/025837 (filed Apr. 3, 2018), 26 pages.

* cited by examiner

COGNITIVE SYSTEM FOR COMPUTER AIDED DESIGN

RELATED APPLICATIONS

This is a NONPROVISIONAL of and claims priority to U.S. Application No. 62/481,441 filed Apr. 4, 2017, incorporated herein by reference.

FIELD OF THE INVENTION

The present invention relates to the use of computer aided design tools, in particular to a cognitive system to automatically determine optimal topologies and/or materials for a proposed design, depending on available manufacturing processes.

BACKGROUND

Computer Aided Design (CAD) systems have come a long way in the last few years, however a major design paradigm has remained since the era of drafting designs with pencil and paper; the user is expected to develop the desired design (perhaps with some system-prompted suggestions as to alternatives) and to realize it as a geometric model. The available modeling tools are usually derived from traditional subtractive manufacturing processes, such as cutting, drilling and milling. When the model is ready, Finite Elements Analysis (FEA) algorithms are used to validate mechanical properties and performance of the model. The most advanced topology optimization tools provide suggestions to the user on the best geometries for given load profiles, but manual re-modelling by the user is still required to produce the final design.

SUMMARY OF THE INVENTION

Described herein are methods and systems for augmenting engineering design or designing material microstructures. A computer-aided design (CAD) model of an article for manufacture, together with user problem definition input including materials, constraints, load conditions, preferred manufacturing processes, etc. for an optimized design of the article or material microstructure are received via a prompt-and-response graphical user interface. Based on this information, one or more routines to iteratively optimize material distribution within said article or the material microstructure design are executed in order to achieve best performance for materials, loads, and constraints specified by the user. At the completion of the optimization process, the user is presented the optimized design in a CAD file describing the optimized design of the article for the preferred manufacturing process or a newly designed material microstructure, as appropriate.

In one embodiment, the graphical user interface is presented in a web browser executing on a user's computer system and may include a plurality of interface screens configured for prompt-and-response interaction with the user, including individual part selection for application of the constraints and load conditions. Via the graphical user interface, the user may, optionally, specify an optimization type or target to be used when determining the optimized design. Further, the graphical user interface preferably includes a plurality of screens consisting of tri-panel views in which individual ones of the panels maintain consistent state throughout the problem definition by the user. For example, the tri-panel views may include a first panel for providing instructions or guides to the user, a second panel for providing a view of the article, and a third panel describing design criteria being operated upon.

In various embodiments, the graphical user interface may be configured to allow the user to specify material selection by material type and additional constraints including one or more of: density, yield stress, Poisson ratio, and Young's modulus; to prompt the user to specify topology optimization on a part-by-part basis for the article; to prompt the user to specify load scenarios on a part-by-part basis for the article; and to prompt the user to specify one or more functionalities of the article for consideration while executing the one or more routines to iteratively optimize material distribution within said article.

These and further embodiments of the present invention are described more fully below.

DETAILED DESCRIPTION

Reference is made now in detail to specific examples for practicing the invention. The present inventors have recognized that a cognitive design system in which a user specifies design requirements, environmental conditions, load profiles, and constraint conditions in which an article of manufacture will operate but where a computer-based system will generate the optimal design for the article to meet the specified requirements, constraints, and, optionally, preferred manufacturing method, will alleviate a user from tedious and iterative design tasks. Such a system, along with alternative examples thereof are described herein. Aspects of the present invention were developed in relation to computer aided designs, but the invention is not so limited and can be applied in the context of material development as well as the design of articles of manufacture.

Figure 1:
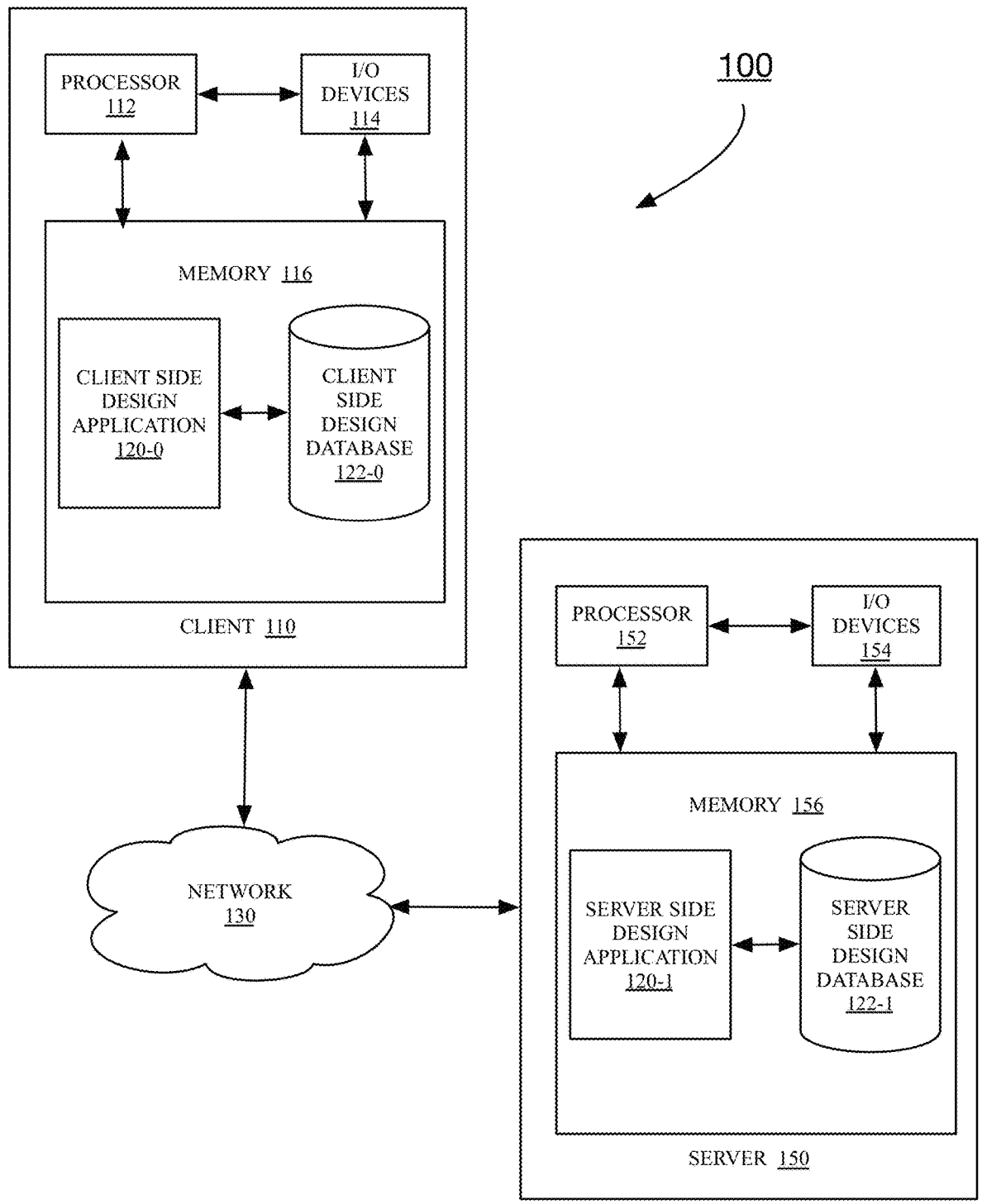
FIG. 1 is a schematic block diagram illustrating exemplary computer systems configured in accordance with one or more embodiments of the present invention.

FIG. 1 illustrates a system 100 configured to implement one or more aspects of the present invention. As shown, system 100 includes a client 110 coupled via a network 130 to a server 150. Client 110 may be any technically feasible variety of client computing device, including a desktop computer, laptop computer, mobile device, and so forth. Network 130 may be any technically feasible set of interconnected communication links, including a local area network (LAN), wide area network (WAN), or the Internet, among others. Server 150 may be any technically feasible type of server computing device, including a remote virtualized instance of a computing device, one or more physical cloud-based computing devices, a mixture of the two, a portion of a datacenter, and so forth.

Client 110 includes processor 112, input/output (I/O) devices 114, and memory 16, coupled together. Processor 112 may be any technically feasible form of processing device configured process data and execute program code.

Processor 112 could be, for example, a central processing unit (CPU), a graphics processing unit (GPU), an application-specific integrated circuit (ASIC), a field-programmable gate array (FPGA), and so forth. I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may be any technically feasible storage medium configured to store data and software applications. Memory 116 could be, for example, a hard disk, a random access memory (RAM), a read-only memory (ROM), and so forth, including a combination of such storage mediums. Memory 116 includes (that is, stores) client-side design application 120-0 and client-side database 122-0. Client-side design application 120-0 is a software application that, when executed by processor 112, causes processor 112 to generate a rendering of a CAD object. In doing so, client-side design application 120-0 may access client-side database 122-0. Client-side design application 120-0 may also interoperate with a corresponding design application that resides within server 150 and access a database that also resides on server 150, as described in greater detail below, in such instances, client-side design application may be a web browser application which renders, at client 110, a user interface for server-side design application 120-1 according to instructions provided by server-side design application 120-1. In many cases this will be a preferred arrangement inasmuch as it forgoes the need for separate installations of dedicated client-side design applications.

Server 150 includes processor 152, I/O devices 154, and memory 156, coupled together. Processor 152 may be any technically feasible form of processing device configured to process data and execute program code, including a CPU, a GPU, an ASIC, an FPGA, and so forth. I/O devices 114 may include devices configured to receive input, devices configured to provide output, and devices configured to both receive and provide input and output, respectively.

Memory 156 may be any technically feasible storage medium configured to store data and software applications, including a hard disk, a RAM, a ROM, and so forth, including combinations of the foregoing. Memory 156 includes (i.e., stores) server-side design application 120-1 and server-side database 122-1. Server-side design application 120-1 is a software application that, when executed by processor 152, causes processor 152 to generate an optimized design of the CAD object. In doing so, server-side design application 120-1 may access server-side database 122-1. Server-side design application 122-1 may also interoperate with client-side design application 120-0 and access client-side database 122-0.

In operation, client-side design application 120-0 and server-side design application 120-1 cooperate to implement any and all of the inventive functionality described herein. In doing so, either one or both of client-side design application 120-0 and server-side design application 120-1 may access either one or both of client-side database 122-0 and server-side database 122-1. Generally, client-side design application 120-0 and server-side design application 120-1 represent different portions of a single distributed software entity. Thus, for simplicity, client-side design application 120-0 and server-side design application 120-1 will be collectively referred to herein as design application 120.

Similarly, client-side database 122-0 and server-side database 122-1 represent different portions of a single distributed storage entity. Therefore, for simplicity, client-side database 122-0 and server-side database 122-1 will be collectively referred to herein as database 122.

Figure 2:
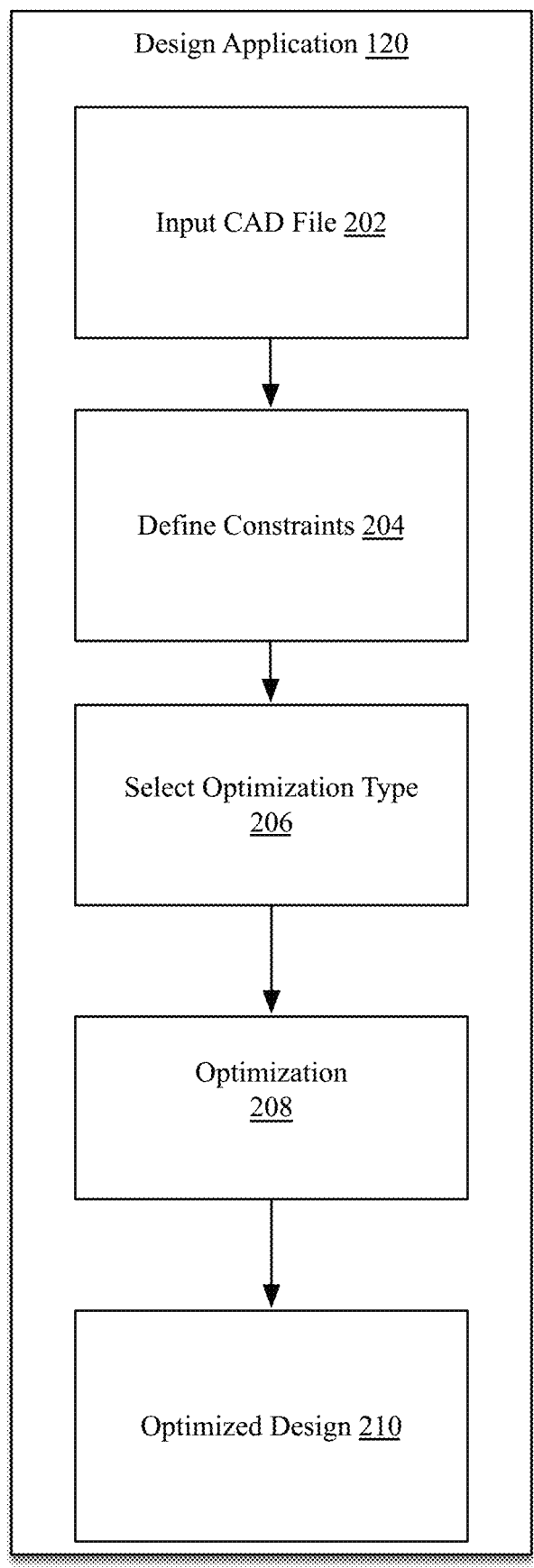
FIG. 2 is a flow diagram illustrating an exemplary method for cognitive aided design in accordance with one or more embodiments of the present invention.

As described in greater detail below in conjunction with FIG. 2, design application 120 is configured to interact with an end-user (e.g., a user of client 110) in order to generate an optimized design for an article of manufacture that satisfies criteria associated with user-defined constraints. Design application 120 receives input from the end-user (e.g., via I/O devices 114) that outlines the desired constraints (length, width, height, load profiles, turning radii, material properties, etc.) that the article must comply with. The constraint input may be assisted through a prompt-and-response dialog between the system (e.g., design application 120) and the user, in which the user is guided through a set of questions tailored to the article being designed and/or environment of its intended use. For example, if the article being designed is a handle, the system may guide the user (e.g., through a user interface provided by design application 120) in the design process by prompting the user to supply information (e.g., via I/O devices 114) concerning the environment in which the handle is to be used (e.g., for a kitchen cabinet), the loads expected (e.g., 0-10 N), the materials desired (e.g., aluminum), the size constraints (e.g., 15-20 cm×1-1.5 cm), and so on. Over time, the system may develop and maintain a database of designs that can be drawn upon (e.g., as examples) for assisting with new designs for various articles.

Based on the design parameters and constraints entered, design application 120 then generates the design of the article, optimized for the specified parameters, constraints, and, optionally, a specified or recommended manufacturing process, and delivers the optimized design in a format suited to the specified manufacturing process (e.g., 3D printing, injection molding, etc.). To develop the optimized design, design application 120 searches database 122 to identify and retrieve information relevant to different approaches for meeting the design outlined by the constraints (e.g., type of manufacturing process, load constraints, material considerations, etc.) and uses this information, along with the design information entered by the user as parameters for one or more optimization algorithms.

One of the advantages of this technique is that the end-user need not attempt to consider all possible approaches to solving the design problem or design the object and thereafter run load testing to determine if constraints are met. Further, design application 120 also generates actual designs based on those approaches, thereby alleviating the burden of generating designs from the end-user. FIG. 2 sets forth a more detailed description of the functionality discussed briefly above.

Recall that design application 120 is communicatively coupled to database 122. Further, design application 120 invokes various data and processing stages in performing the techniques described herein. Specifically, design application 120 includes a module for receiving input of a CAD file 202, a module for defining design constraints 204, an optional module for selection of optimization algorithm(s) 206 (where such selection is permitted), an optimization module 208, and a module for delivering the optimized design as a CAD file 210 (or other output, as appropriate). Database 122 includes data that is processed by design application 120 when performing these processes. In particular, database 122 includes one or more optimization algorithms. As used herein, the term "module" should be understood as referring to a unit or part of a larger computer program. The program as a whole is composed of one or more modules, which may be independent from one another until combined at the time the program is linked. Each module may contain one or more individual routines. Modularization in this fashion is preferred (e.g., for purposes of development, etc.), but not mandatory.

In operation, design application 120 is configured to receive, via an input CAD file module 202, a CAD model via interactions with an end-user. Generally, input CAD file module 202 includes one or more user interface screens to prompt a user to input, via one or more input devices such as a keyboard or a mouse, an existing CAD file that defines the article under consideration. The CAD file(s) is (are) digital files that describe the subject article being designed. In effect, the CAD file(s) describe the article's geometry, both mathematically and structurally. The CAD file(s) may be in any conventional format and may specify a three-dimensional model and/or wireframe, and/or two-dimensional views of the article.

Design application 120 receives input CAD file(s) 202 and, via module 204, user-defined constraints for the article under consideration. As indicated above, these constraints may include material characteristics, load profiles to be experienced by the article, sizes and other limitations that must be met, etc. The cognitive design system interacts with the user to receive these and other inputs through an interface that may allow for iterative development of the constraints. As part of this process, conflicting requirements may be highlighted at the time they are entered so as to avoid later errors. For example, if a user enters constraints that require an object to be both rigid and capable of deformations (e.g., to conform to a hand shape of a user), the system is configured to identify this conflict and advise the user thereof so that appropriate action can be taken.

Define constraints module 204 may also include one or more data structures that embody all of the design considerations, allowing for rendering of load profiles with respect to positions on the article. For example, define constraints module 204 could reflect a 3D object (non-optimized) which includes specific locations where certain forces are to be supported, or expected to be applied, along with certain final materials and particular meta-materials. In one embodiment, the end-user directly defines constraints such as these via interaction with design application 120.

Based on the defined constraints, a skilled user may be permitted to select the optimization type or target 206 to be used, while in other cases the system will make such selection(s) without user involvement. By optimization type or target, we mean the one or more parameters upon which the optimization may be based. For example, optimization may be based on mass (e.g., to achieve minimal mass for the design), performance, displacement, etc. Once selected, optimization module 208 applies the selected optimization algorithm(s) to optimize the design. This may involve one or more iterations to optimize the design according to the specified optimization type, but these iterative processes are not exposed to the user. Once complete, an optimized design module 210 presents the user with an optimized CAD file (that is, a description of the article optimized according to the selected parameter in the language of a CAD program) generated for use with a selected manufacturing method, or other output as appropriate.

Optionally, a post-processing operation within optimization module 208 may be utilized for cleanup of the design prior to generation of a final optimized CAD file. Post-processing can include steps for cleanup of a design based on the selected manufacturing process, as well as removal of disconnected areas of a design, or fixing of missing elements.

Figure 3A:
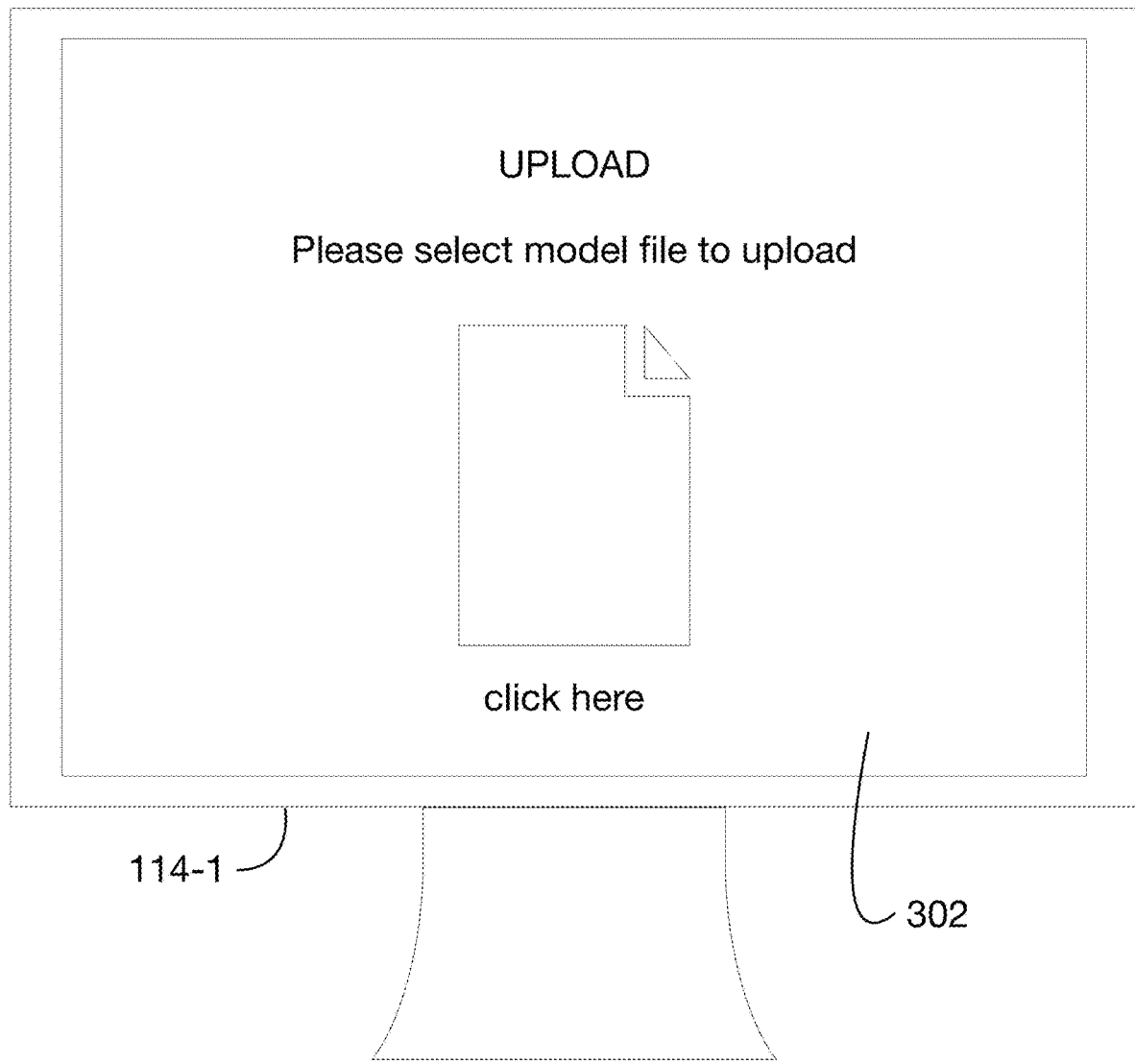
FIGS. 3A-3R illustrate examples of user interface screens for a design application for cognitive aided design in accordance with one or more embodiments of the present invention.
Figure 3B:
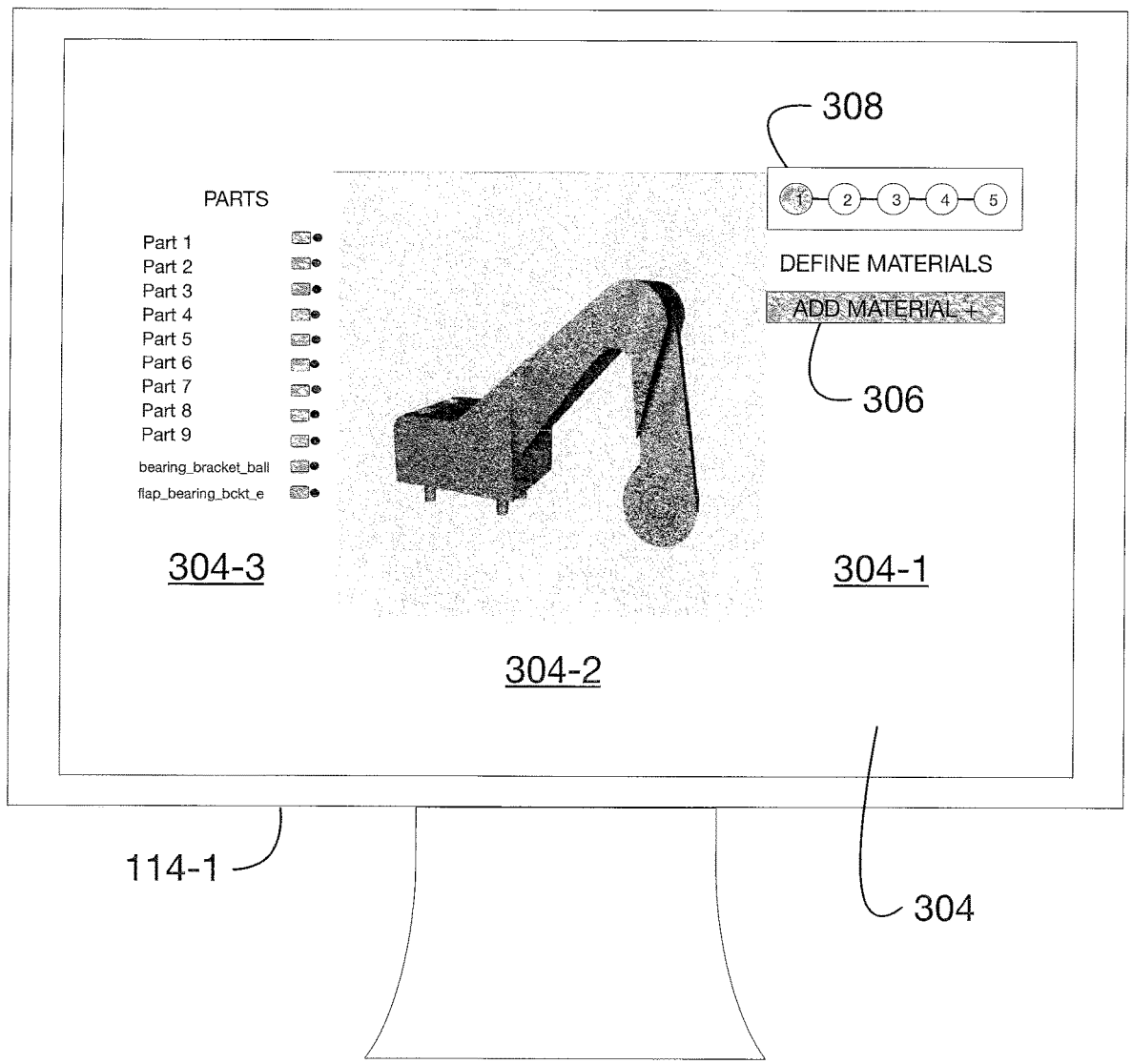
Figure 3C:
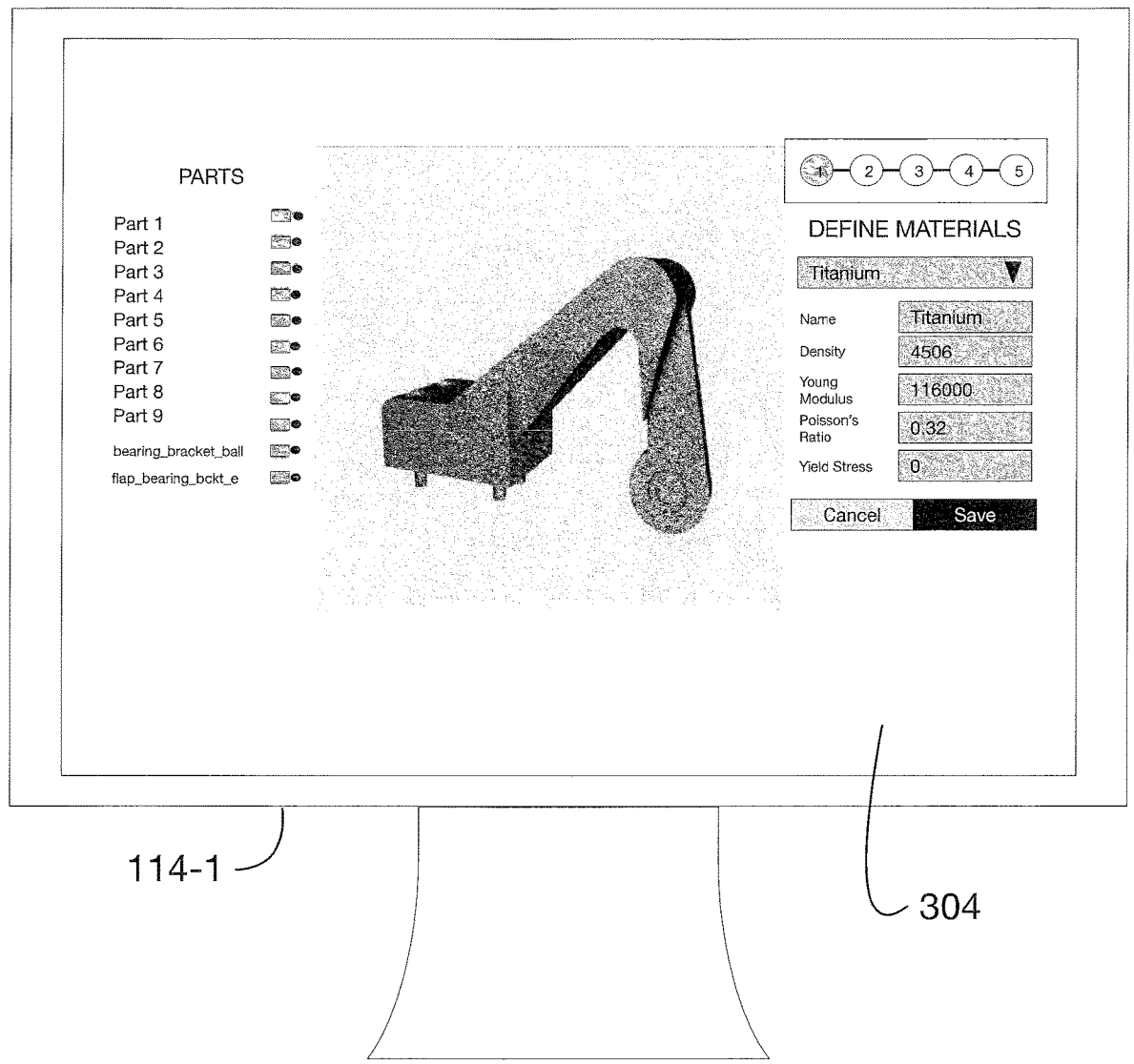
Figure 3D:
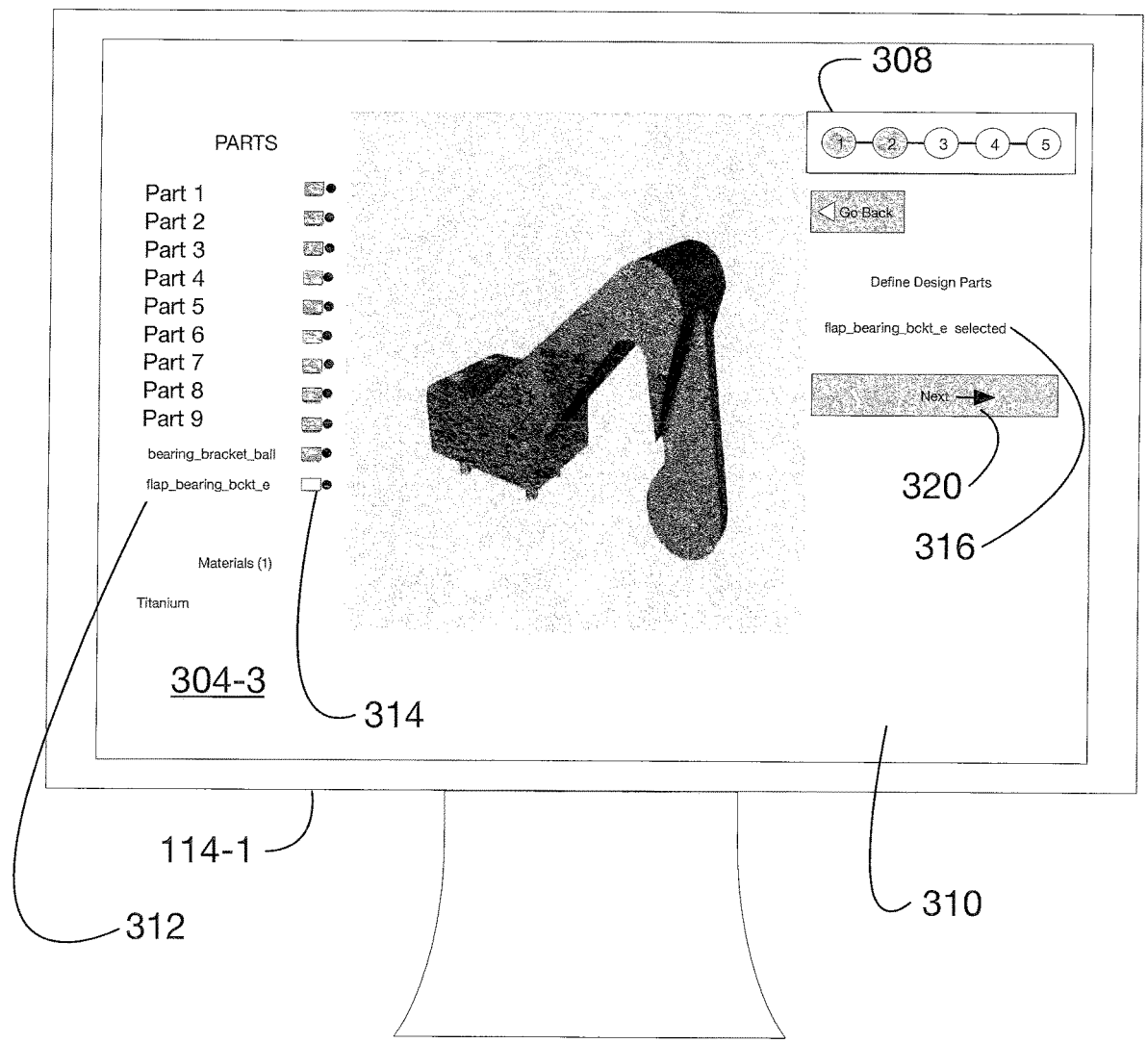
Figure 3E:
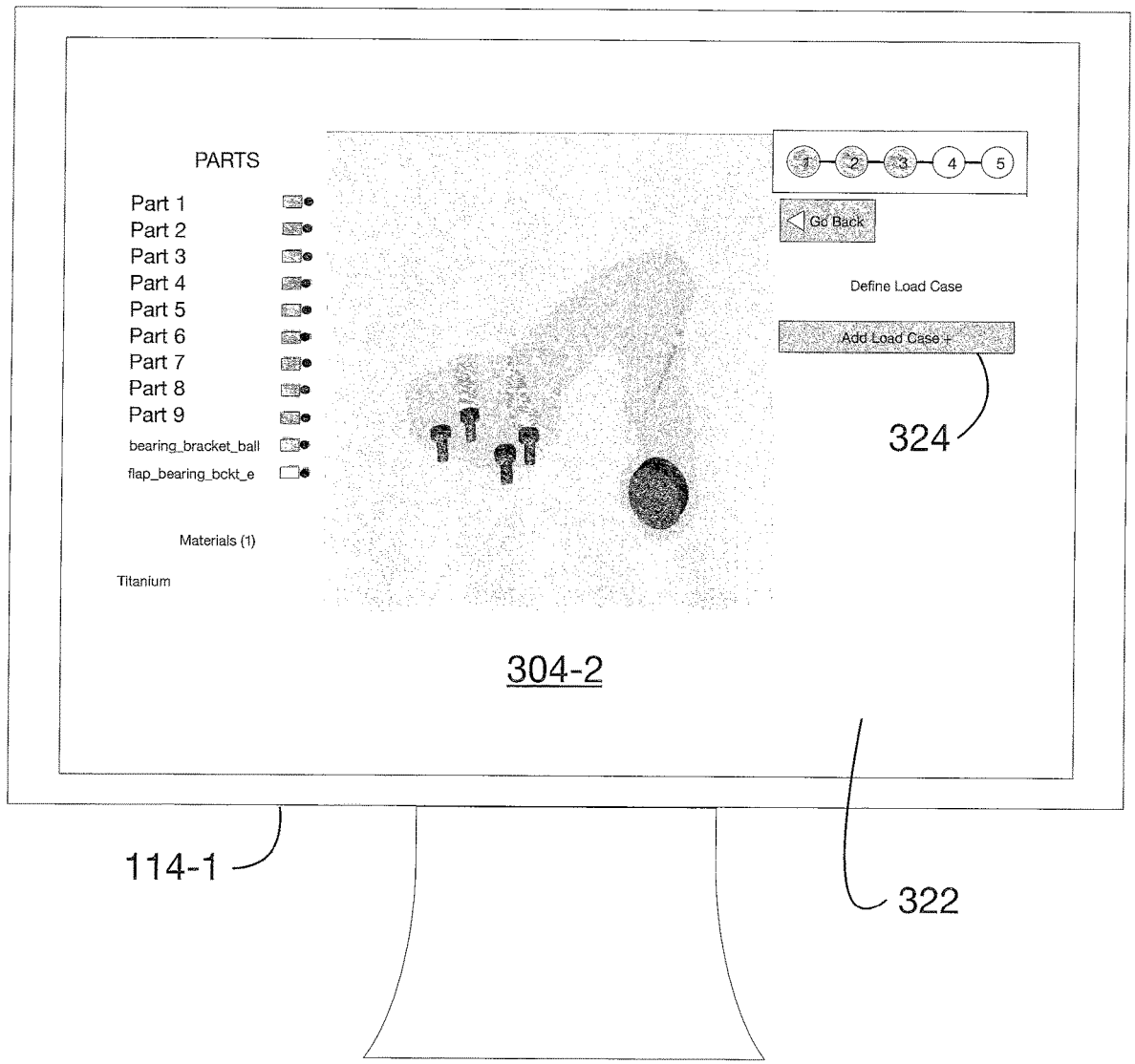
Figure 3F:
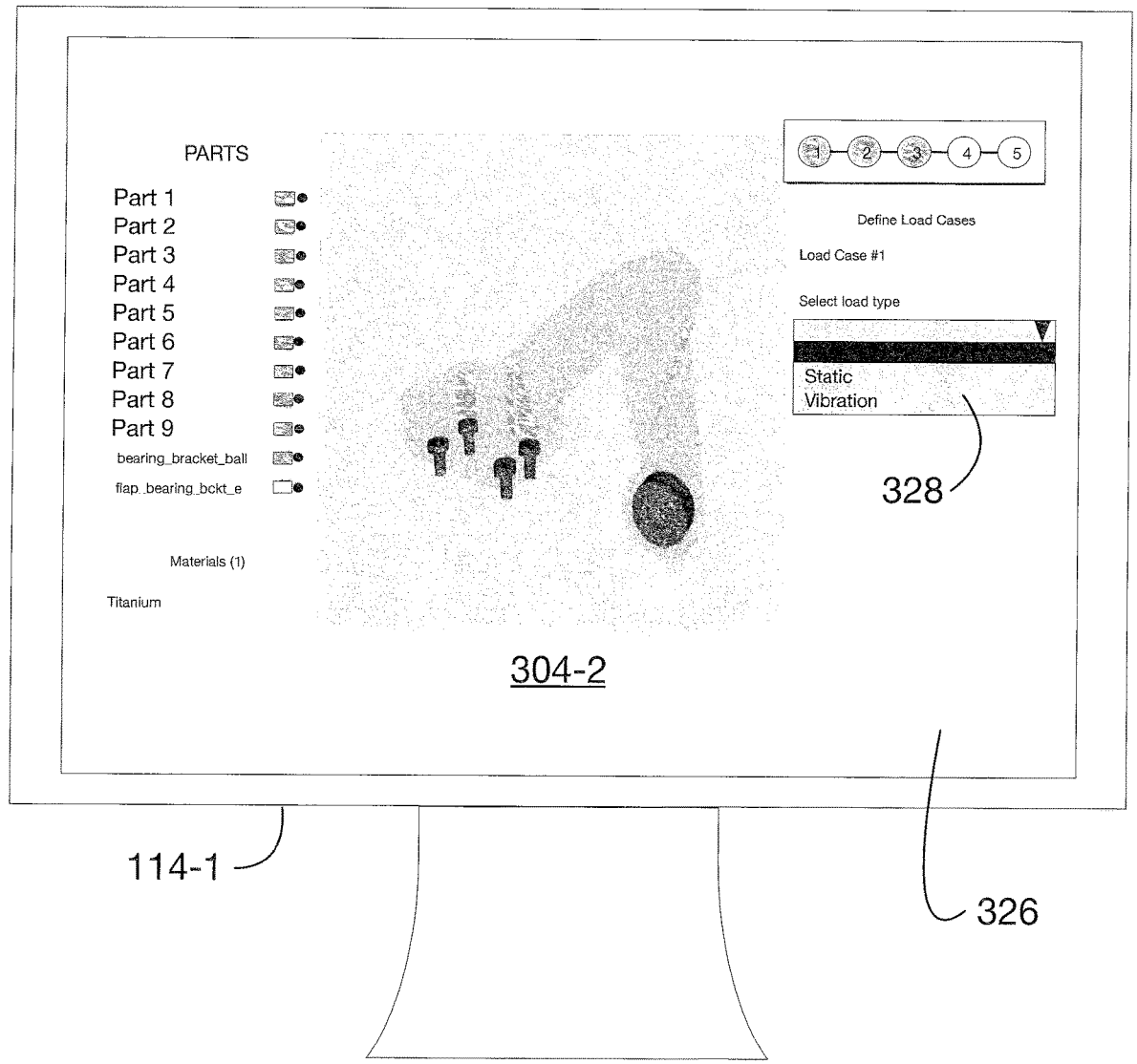
Figure 3G:
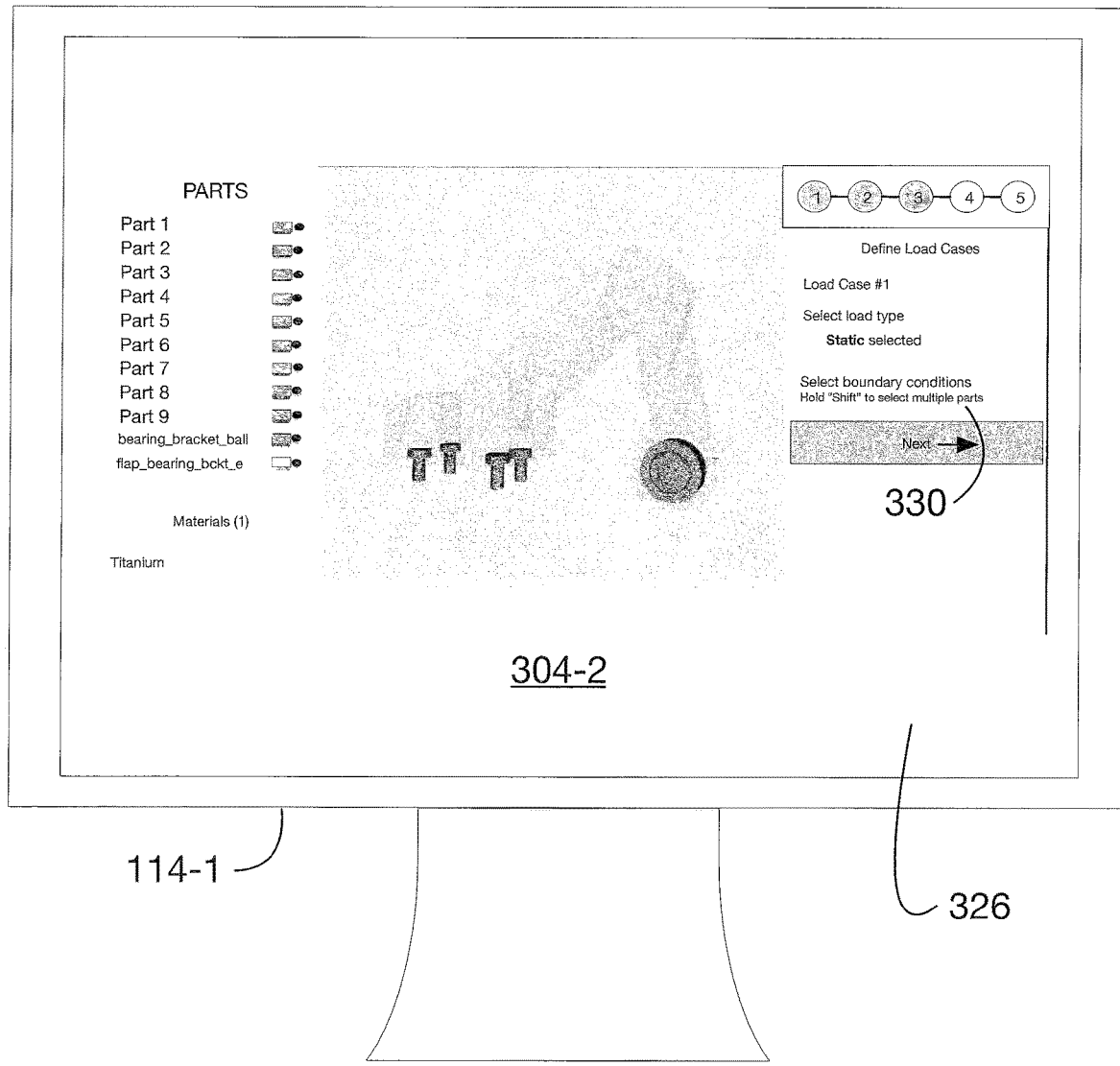
Figure 3H:
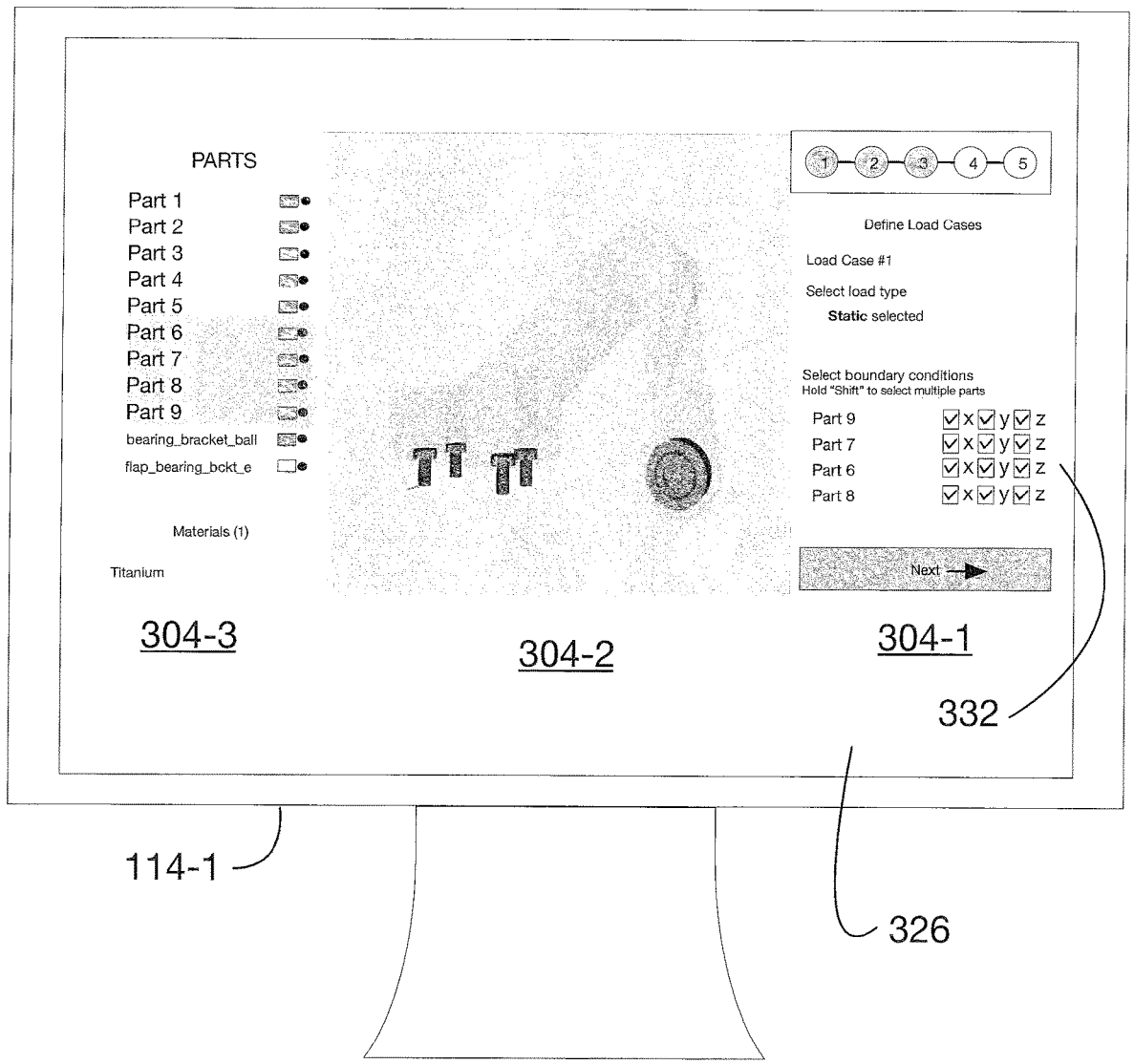
Figure 3I:
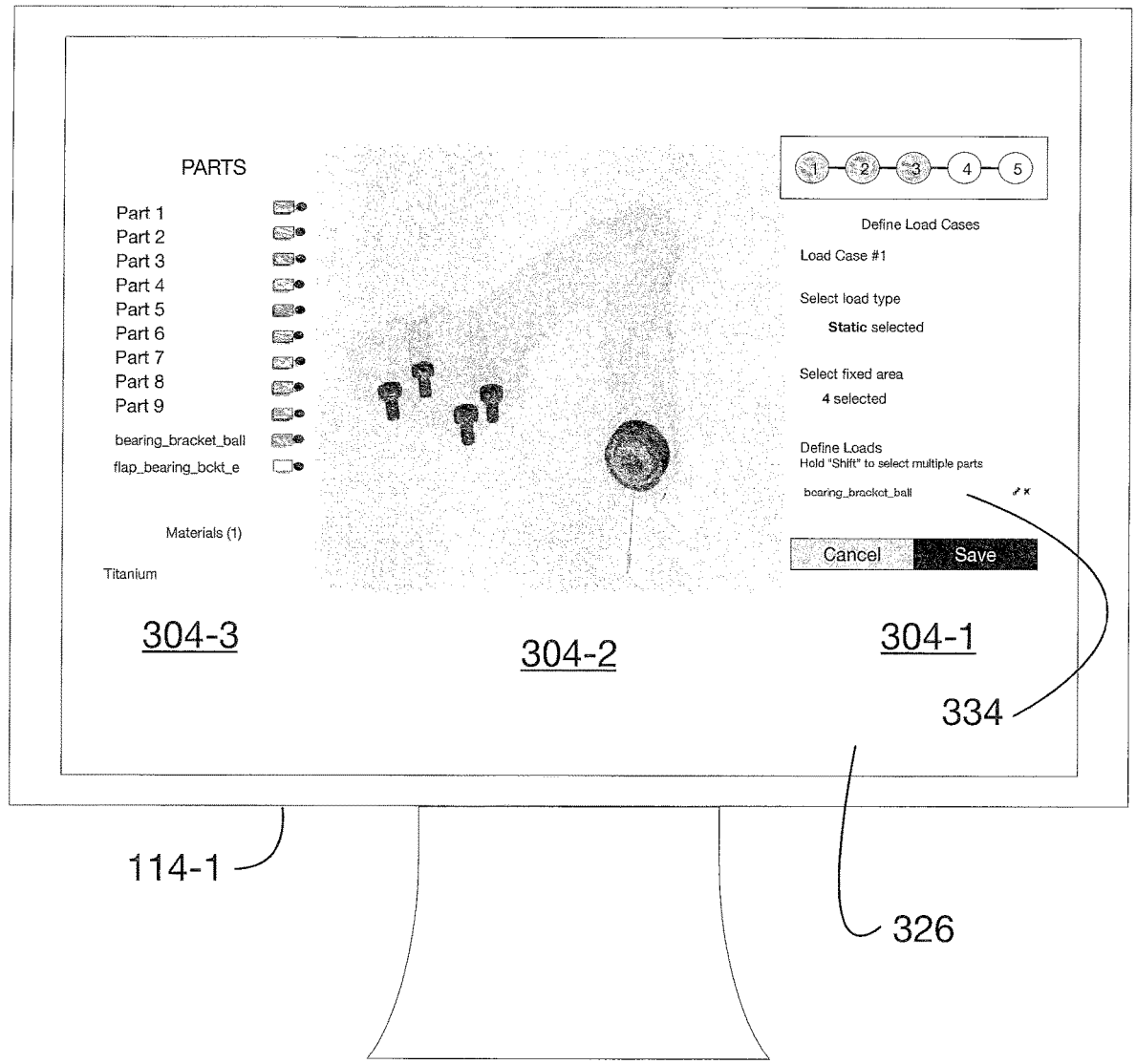
Figure 3J:
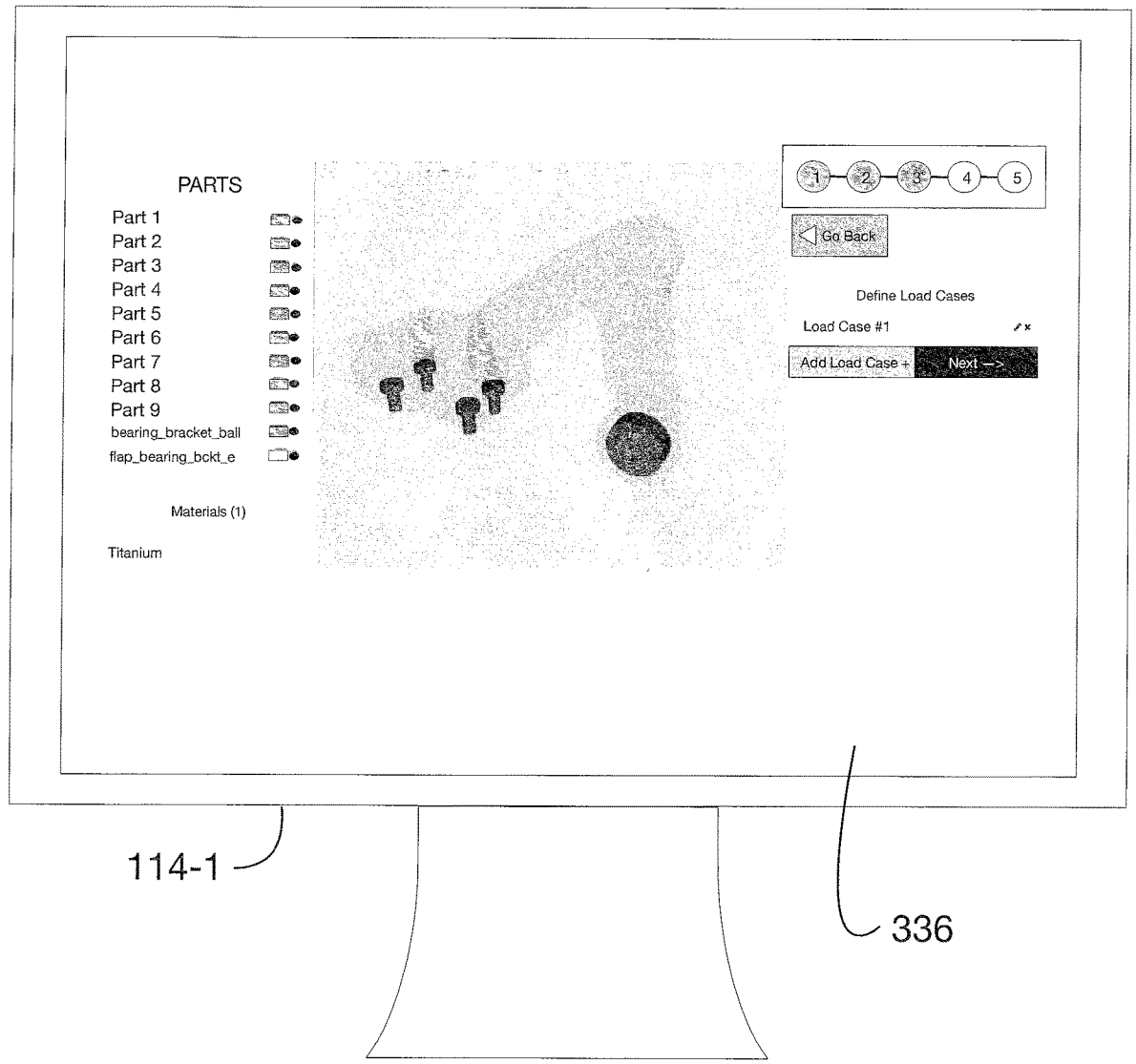
Figure 3K:
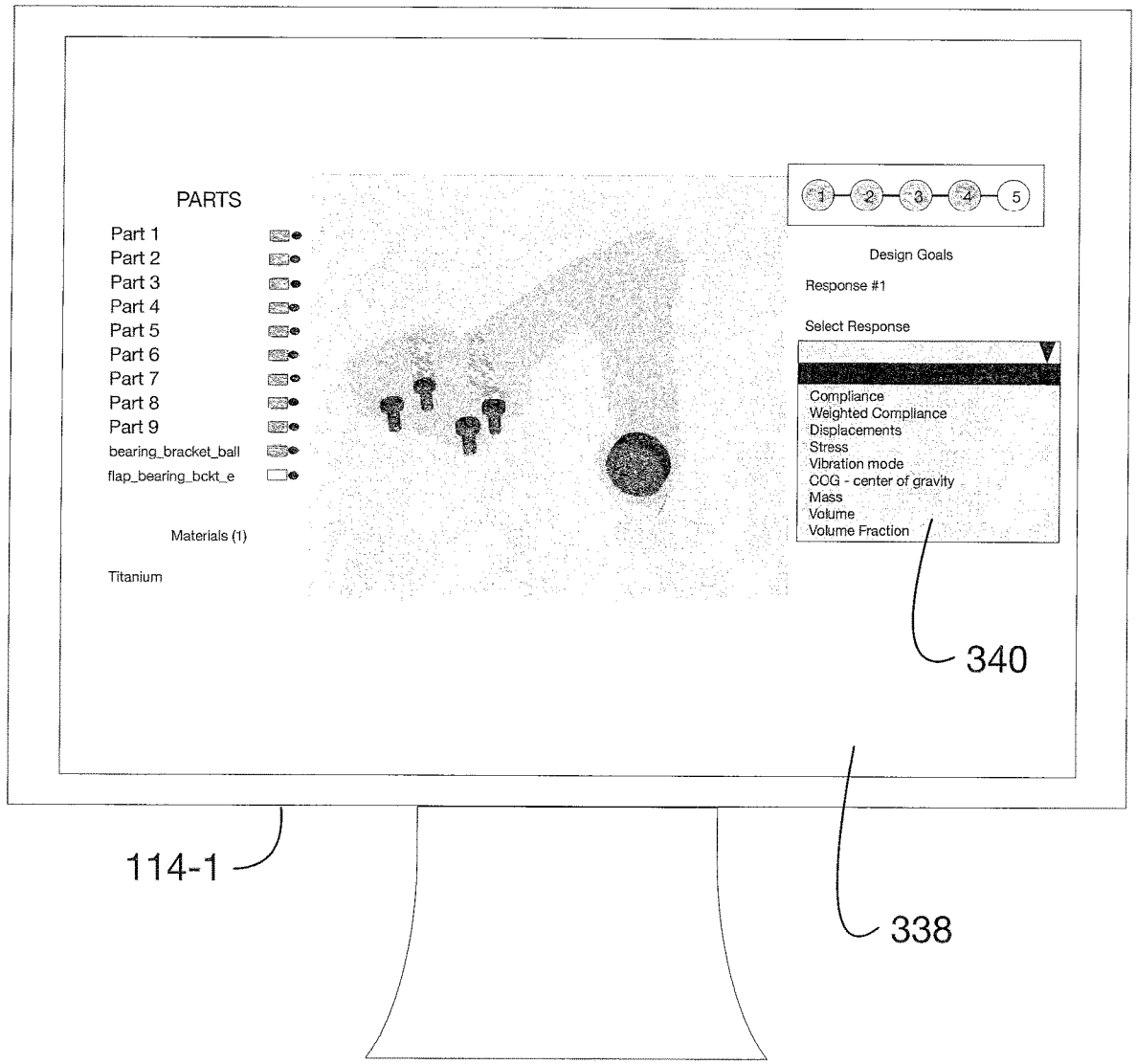
Figure 3L:
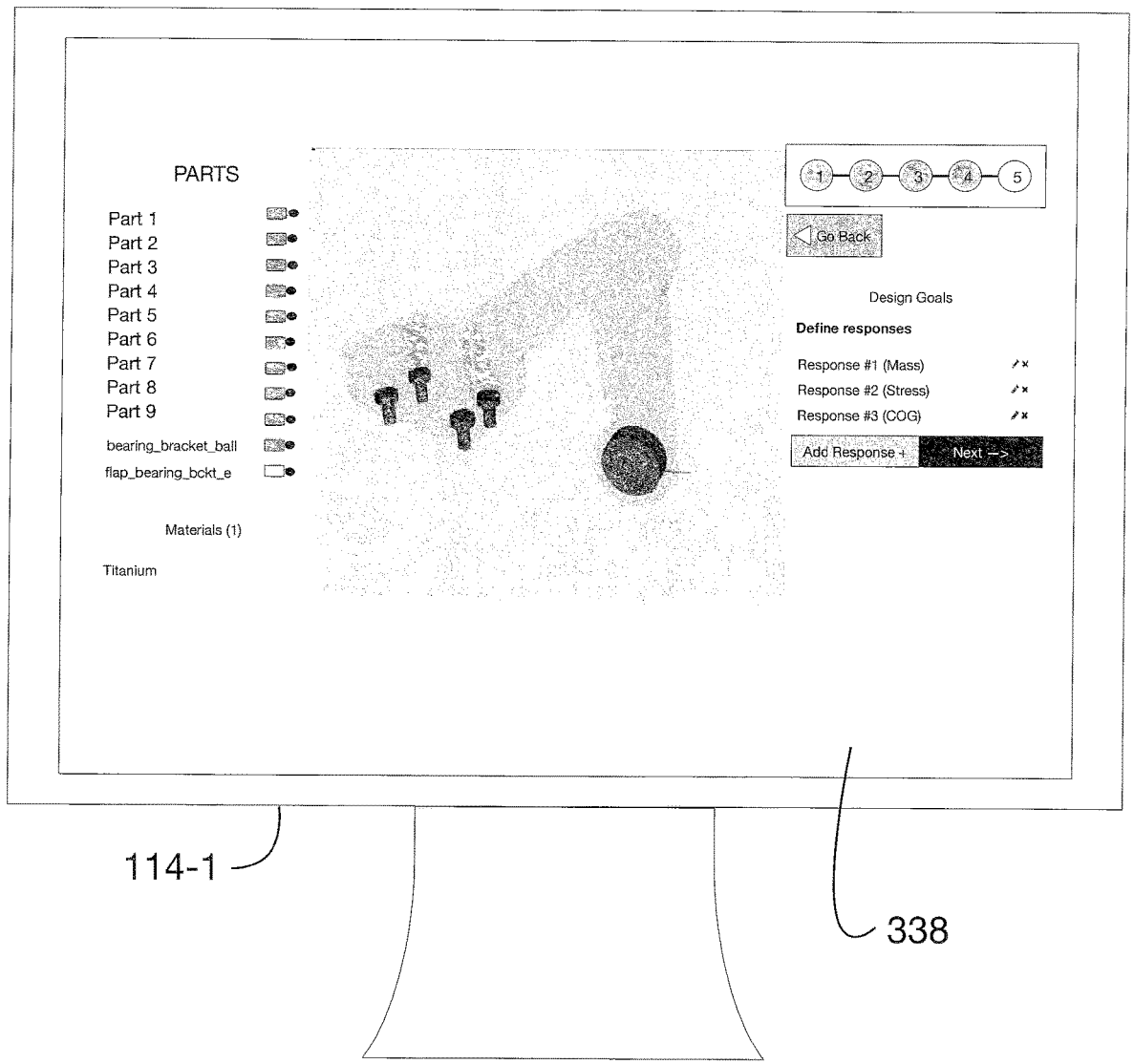
Figure 3M:
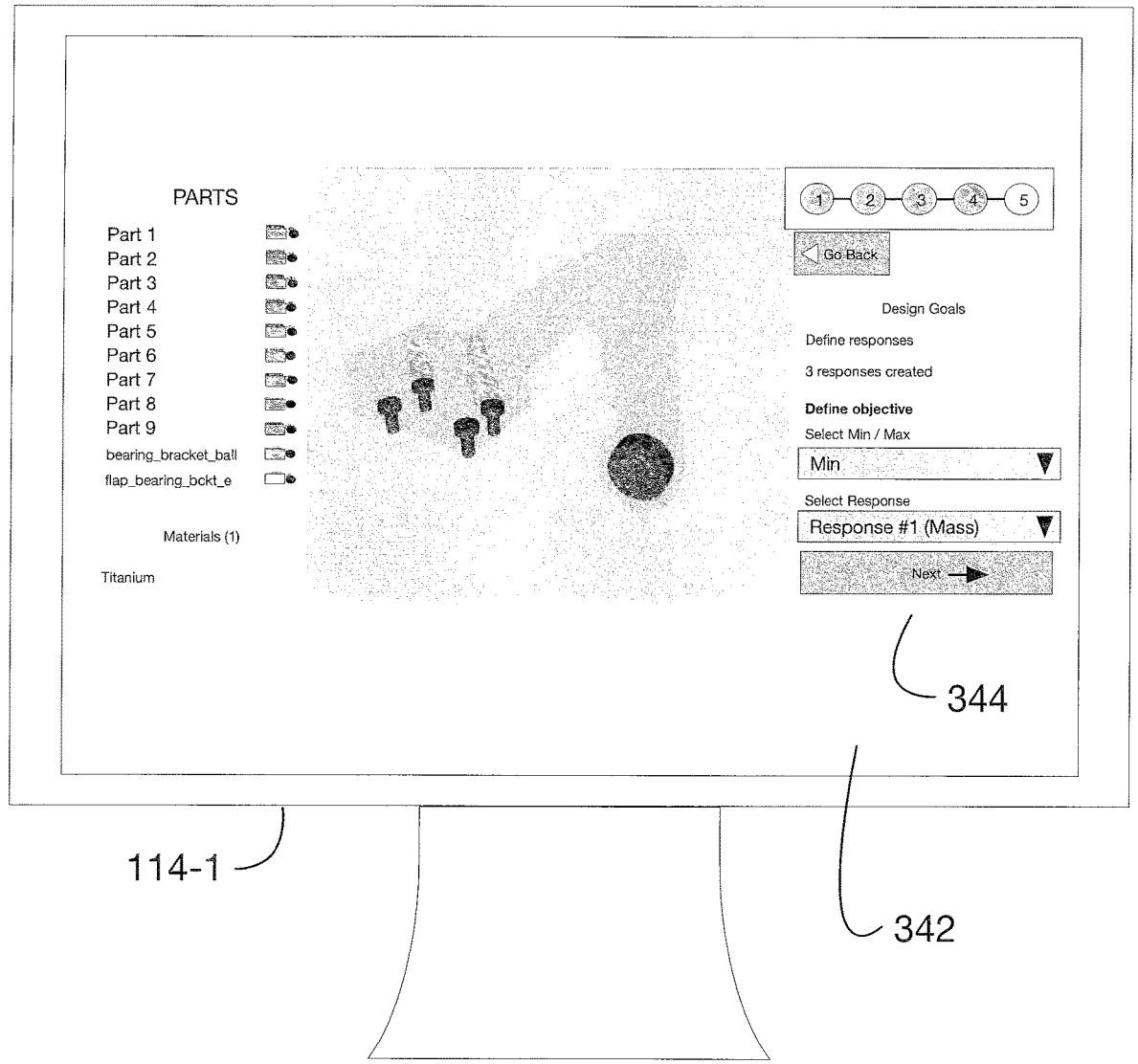
Figure 3N:
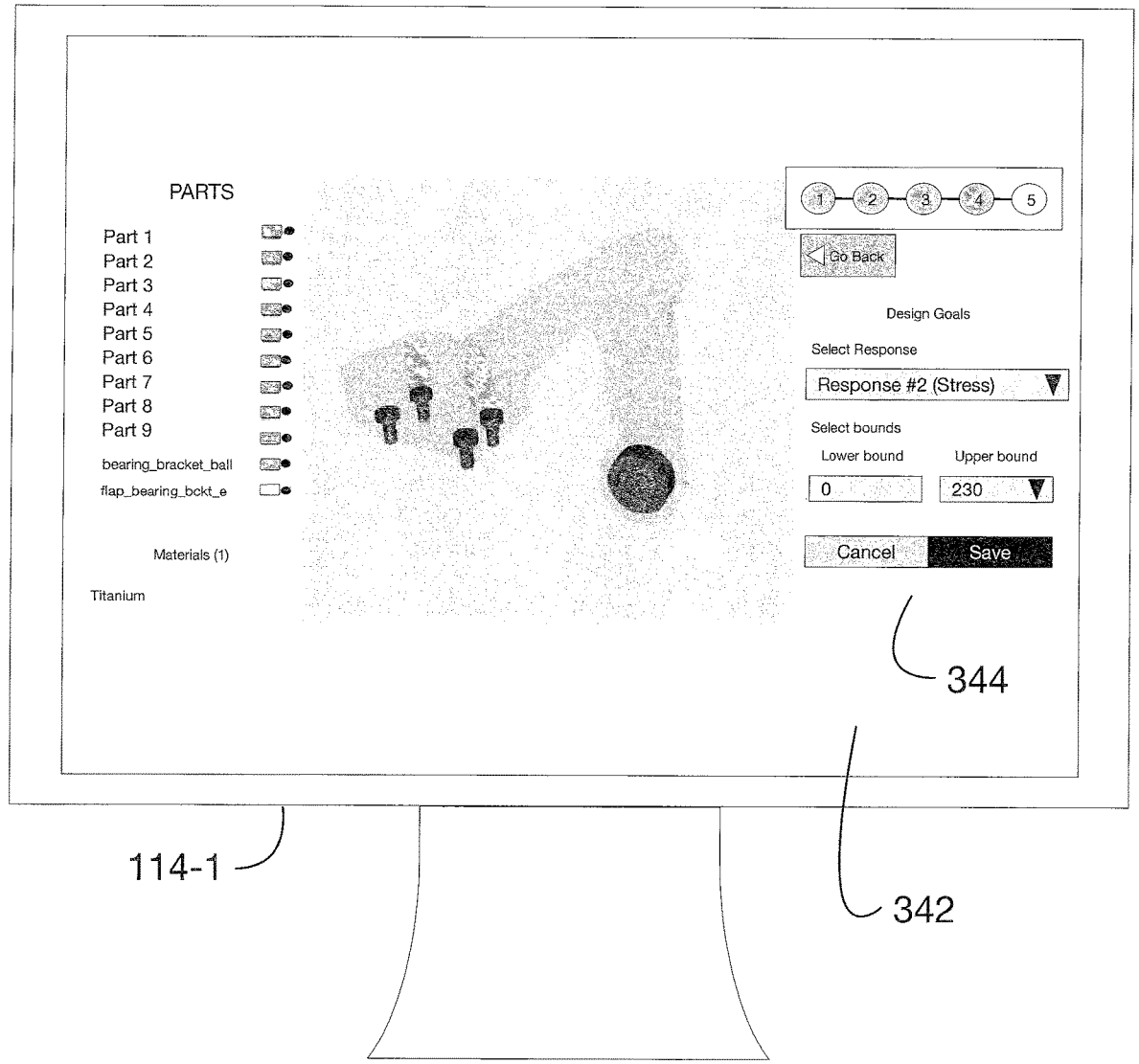
Figure 3O:
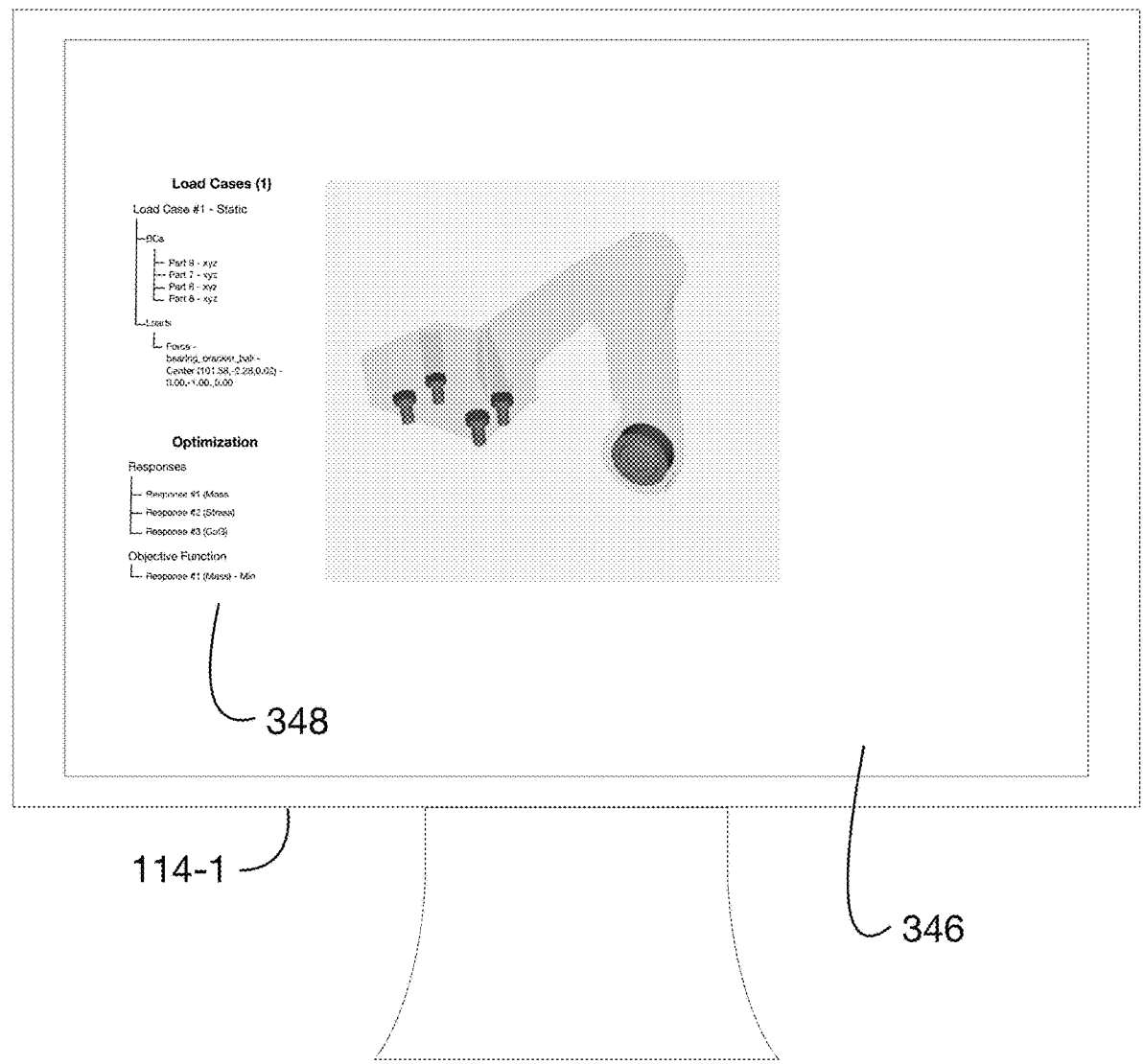
Figure 3P:
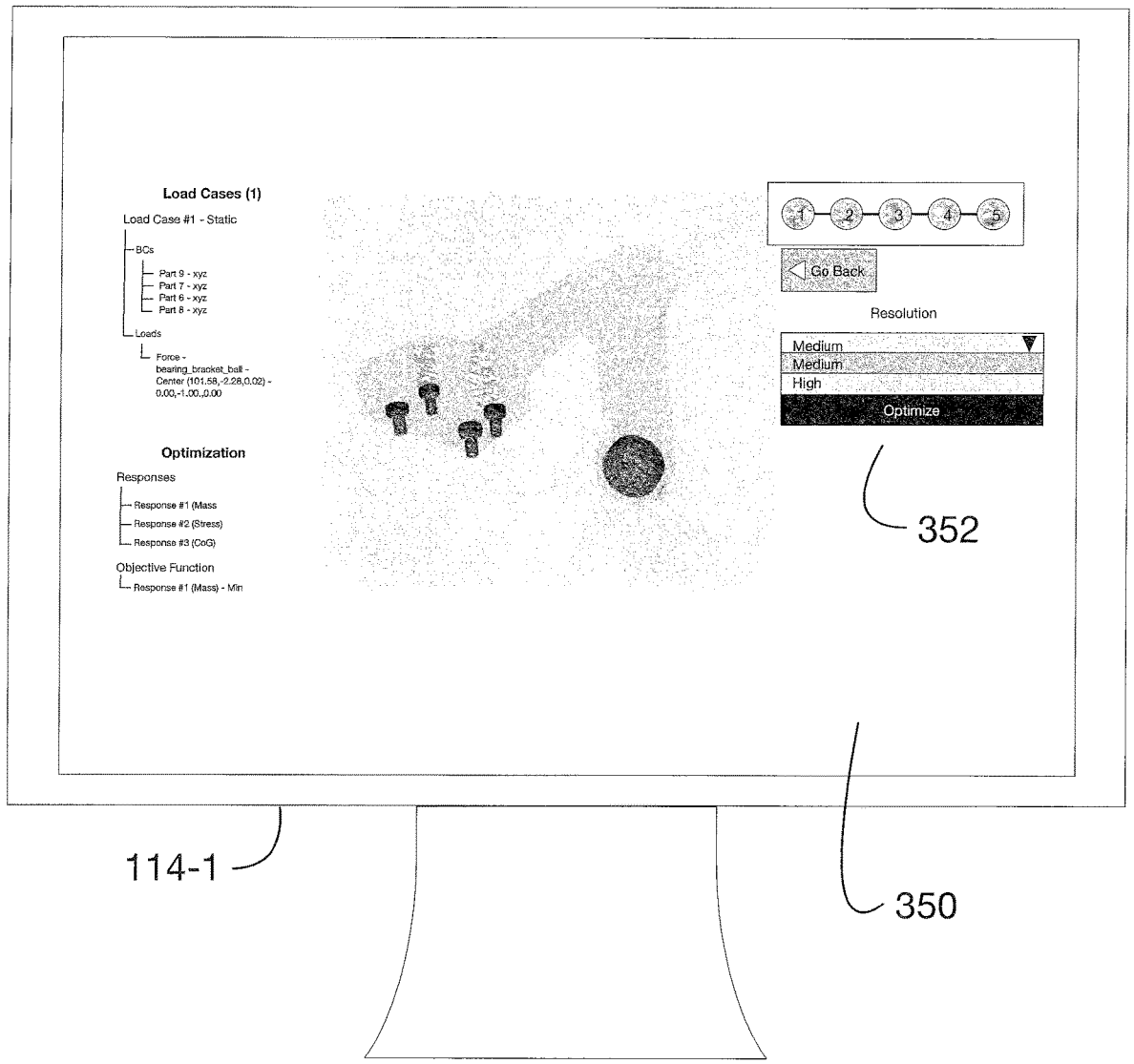
Figure 3Q:
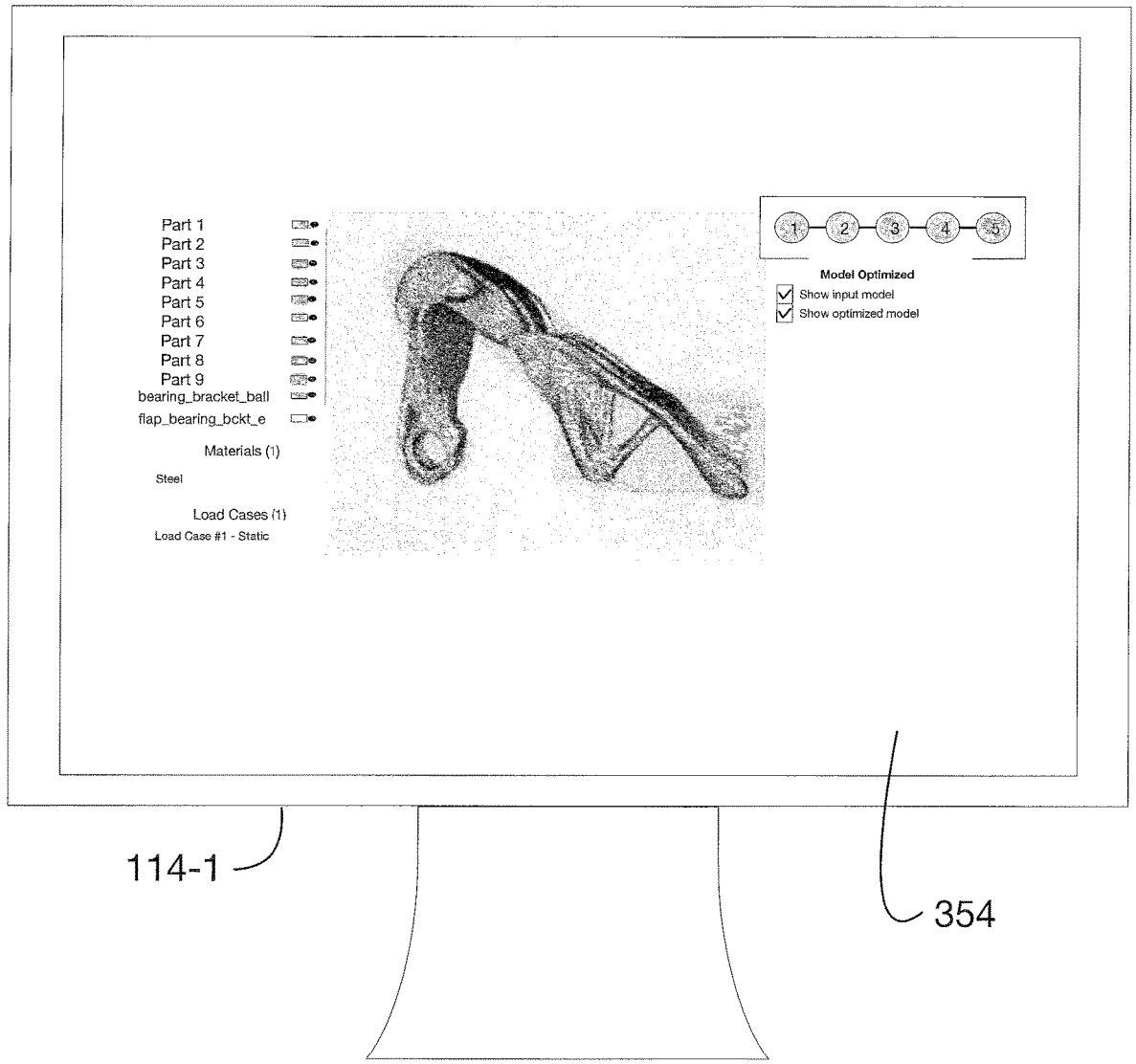
Figure 3R:
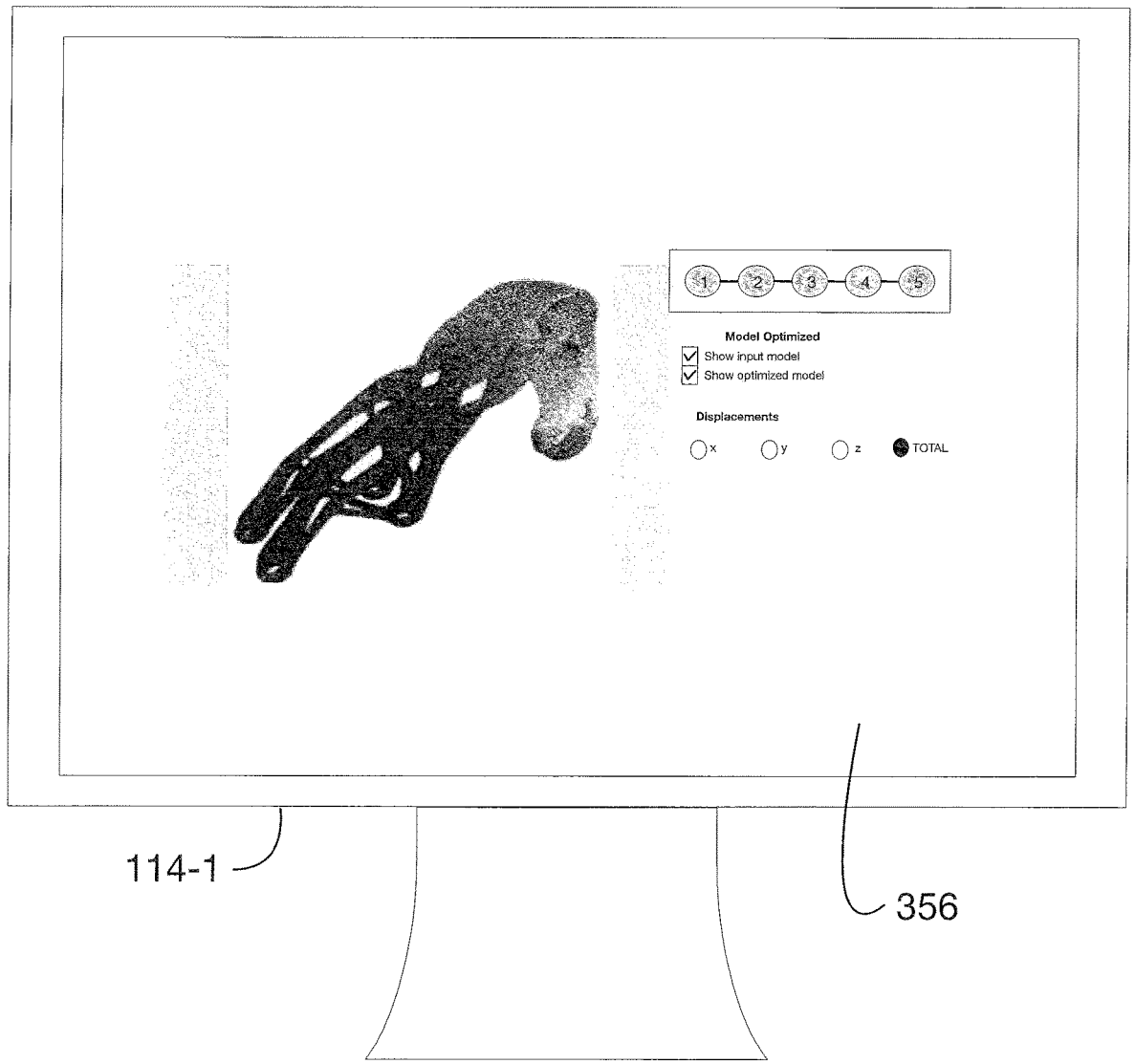

Referring to FIGS. 3A-3R, an interactive, step-by-step user interface for design application 120 is described. In these illustrations, the screens of the user interface are shown as displayed on a display 114-1, which may be a component of I/O devices 114 at client 110. The user interface of the design application 120 provides a facility for a user of the design application to provide an input CAD file, define constraints for the article under consideration, receive feedback concerning any conflicting requirements that are specified, optionally select the optimization type or target to be used, and be presented with views of the optimized design developed by the system.

In FIG. 3A, an upload screen 302 allows for a user to upload a CAD file for optimization. The upload screen may provide for selection of a CAD file through a drag and drop action and/or a menu selection, and the uploading progress may be displayed visually, e.g., through a progress bar, etc. When a user has successfully uploaded a file, a message indicating same may be displayed.

FIG. 3B shows an initial screen 304 of define constraints module 204, wherein the material type for the end product is selected. This screen, and others of the user interface, includes three panels, 304-1-304-3. Throughout the various screens of the user interface, the panels maintain consistent "state" inasmuch as they provide areas for instructions or guides to the user (the right-hand panel 304-1), a view of the article undergoing design optimization (the center panel 304-2), and an area describing the design criteria being operated upon (the left-hand panel 304-3). By including instructions in the right-hand panel, a user is guided through the problem definition process. In FIG. 3B, right-hand panel 304-1 provides a button 306 to "Add Materials". By selecting this button, the user may specify or choose the type of material(s) for the article under consideration. A progress map 308 shows the user's current position within the constraint definition process.

As shown in FIG. 3C, screen 304 allows a user to define the material selection not only by specifying the material to be used (titanium in this example), but also through a series of additional constraints such as density, yield stress, Poisson ratio, Young's modulus, etc. The material selection may be afforded through use of a drop-down menu or other means of selection, and the additional constraints may be specified in response to a series of prompts to the user to further refine the material definition. The user can save these inputs once complete.

After selection and specification of the desired material screen 310 prompts a user to select the design part for which topology optimization is desired, as shown in FIG. 3D. In this example, the part selection 312 is made via left-hand panel 304-3. For example, to select the desired part the user clicks on a designation button 314 associated with the desired part. Once designated, information concerning the designated part 316 is also presented in the right-hand panel. When designation is complete, the user may select the "Next" button 320.

As shown in FIG. 3E, once the part to be optimized has been selected, it remains highlighted in the center panel 304-2 of the interface, while the remaining portions of the article are ghosted. This serves as a visual reminder of the part for which optimization has been designated. In this next screen 322 of the user interface, the user is prompted 324 to specify or define a load case/scenario for the designated part.

For example, in a load case/scenario screen 326, an example of which is shown in FIG. 3F, the user may be prompted through a menu, text box, or other interface input means 328 to define the load type, e.g., static load, dynamic (vibration) load, thermal load, etc. Then, as shown in FIG. 3G, the user is prompted to define boundary conditions for the load type by picking relevant parts 330. The relevant parts may be indicated through selection in left-hand panel 304-3, for example by positioning a cursor over the part using a mouse and performing a left click operation. Multiple parts may be selected by holding down a shift button on a keyboard during the mouse selection operations. As the parts are selected in the part list in the left-hand panel, they are highlighted (e.g., through use of a different color) in center panel 304-2. The selected parts are also identified 332 in the right-hand panel 304-1, as shown in FIG. 3H. Directions of restraint may also be specified in this screen.

Once the relevant parts are selected, the applied load locations and directions (i.e., load vectors) can be specified in screen 326, as shown in FIG. 3I. As illustrated, the load vectors may be specified by first highlighting the affected part in the left-hand panel 304-3, and then defining the load 334 in the right-hand panel 304-1.

If needed, multiple load scenarios 336 may be specified, as shown in FIG. 3J. For each load scenario, the load type, designated part and the restraints and load vectors for that part may be defined, as discussed above. Allowing for multiple load scenarios prior to optimization of the design may save time inasmuch as the competing design constraints can be considered collectively, rather than individually.

FIG. 3K illustrates screen 338 of the user interface. Screen 338 allows the user to specify (e.g., through menu selection) the functionality(ies) that is (are) desired to be considered by optimization module 208. That is, once all of the load scenarios have been defined, a user is provided an opportunity to designate the considerations for optimization module 208 to consider during the optimization process. In this example, the user is permitted to select among considerations such as compliance, weighted compliance, displacements, stress, vibration mode, center of gravity, mass, volume, and volume fraction, but these are only examples and more or fewer design considerations may be specified depending on the kind of article under consideration. In some cases, more than one design consideration may be specified, and the user may be asked to rank the considerations in order of importance for the article under consideration. In one example, as shown in FIG. 3L, the user may select mass, stress, and center of gravity as considerations for optimization module 208 to consider during the optimization process.

As shown in FIG. 3M, once the design considerations are specified, the user is provided a screen 342 to further refine the optimization criteria 344. For example, the user may be provided a series of prompts to allow further specification of the optimization objectives for one or more of the specified design considerations. In the illustrated example, the user has specified the desire to minimize the mass of the article under consideration. In other examples, the user may wish to minimize or maximize other parameters of the specified design considerations. In FIG. 3N, the user has specified that the stress should be smaller than 230 MPa. Similar specification for all of the optimization objectives may be provided.

Once all of the specifications for the optimization objectives have been made, the user is provided a summary of his/her selections 348 in an overview screen 346, as shown in FIG. 3O. In this example, the optimization selections are displayed in a tree-type structure in the left-hand panel 340-3 to allow a user to easily see the current selections. Other presentation formats may be used. From here, the user may be permitted to revise one or more selections and/or specifications, e.g., by returning to an earlier constraint designation step. As a final selection option, the user may be prompted in screen 350 to specify or select the desired resolution of optimization 352, as shown in FIG. 3P. Additional features that could be selected at this step could be a minimum feature size, a manufacturing type, or the like.

FIG. 3Q illustrates an output screen 354 from optimized design module 210, which presents the user with a CAD file for the design optimized according to the selected parameters. As shown in FIG. 3R, additional finite element results such as deformations and stresses of the optimized article under the specified loads may be presented in review screens 356. The illustrated example shows deformations of the part under load as a heat map. The final optimized design may be downloaded by the user as a CAD file for a specified manufacturing device, such as a 3D printer or other device.

META-MATERIALS: During the definition of design constraints, an end-user may define certain desired material properties (e.g., Young's modulus, Poisson ratio, shear modulus, isotropy, orthotropy, etc.) desired for the optimized design. Or, in other instances, a user may wish to have a material deigned that exhibits desired characteristics (e.g., a negative Poisson ratio). The present invention may be applied to such material design considerations.

For example, rather than defining a design to be optimized, the user may define, via an input interface similar to that described above in which a prompt-and-response dialog is used, material properties that are desired. Then, the optimization module may be run to design an optimized material microstructure (using a defined base material) that will meet the desired material properties. In some instances, the process may end with the development and provision of the defined microstructure, while in other cases the process may further incorporate the newly designed materials into an optimized design for an article of manufacture. In each case, the optimized deign of the material microstructure is performed by the optimization module 208, according to selected (or default) optimization type or target.

The input interface described above may be a graphical user interface, as shown, and/or a natural language processing interface. In general, it allows users to define geometries, design requirements, environmental constraints, and, optionally, preferred manufacturing methods. The cognitive design optimization system uses the inputs received via the user interface to develop a problem definition that can be applied against the optimization algorithms. Running the selected optimization type or target over the problem definition, as informed by the design constraints, results in a single, optimized design for the article of manufacture (and/or the material) being produced.

As should be apparent from the foregoing description, instead of using the present design application to define the shape of a model of an article for fabrication, the user specifies requirements, for example, environment specifications in which the model will operate, and preferred manufacturing methods and the present system generates the optimal design that will meet these requirements and specifications. The design process in this regard is based on a dialog between the designer and machine. The machine, that is the design application executed by the one or more computer systems shown in FIG. 1, provides guidance and feedback to the user in visual and/or audio form. The generated design is ready for manufacturing and does not require any additional processing.

Returning to FIG. 1, a preferred architecture for the present system consists of a web-based front end for visualization (e.g., a web browser executing on client 110), and cloud-based backend for computation (e.g., a design application executing on server 150). The front end provides the user interface for problem definition and optimized design visualization. The required computations are performed in the cloud-based back end. This architecture allows users to use thin clients, unlike conventional optimization tools that require significant computational resources on the user's side.

Figure 4:
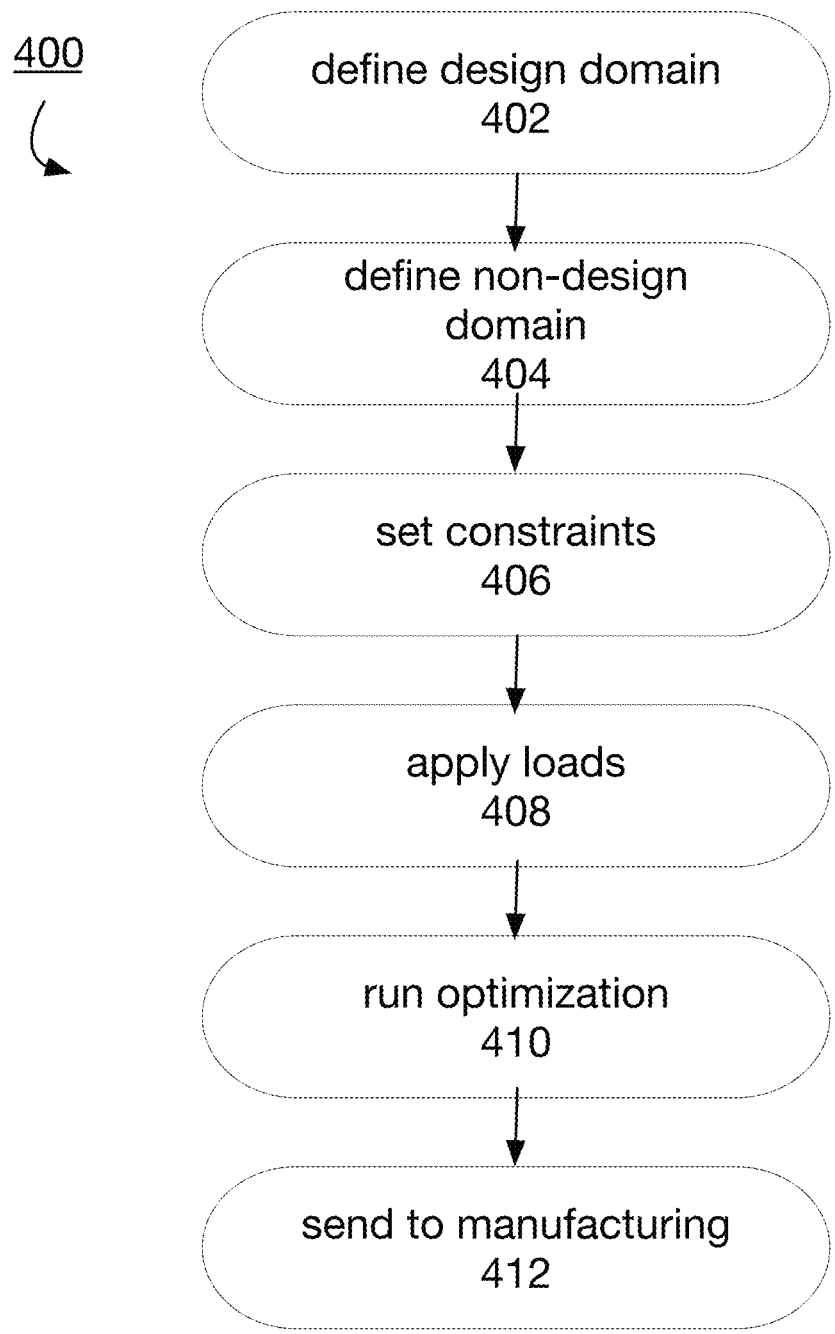
FIG. 4 illustrates an example of a workflow involving a system for cognitive aided design configured in accordance with one or more embodiments of the present invention.

Referring now to FIG. 4, an example of a workflow 400 for the present system is illustrated. The above-described user interface is designed around this workflow, which begins at 402 with the user uploading an assembly that contains the design domain and interface parts, which constitute loads and constraints, such as bolts, bars etc. As discussed above, the upload may involve a previously created CAD model which is uploaded via the above-described user interface as an object to be operated upon by the present design application. Next, at 404, the system will identify potential constraints automatically and will present it to the user for confirmation. Afterwards, at 406, the system will suggest standard load cases based on the application, such as vibrations, thermal stresses etc. The user will confirm or modify suggested loads and apply additional ones when necessary 408. Essentially, through the automated and prompt-and-response interaction with the user, the user is guided through a problem definition stage of design appropriate for the article under consideration. From that point, the system will proceed to the optimization phase 410, which is fully automated. The optimization engine employed in the present design application is an example of Topology Optimization. The optimization algorithm starts from equally or randomly distributed material densities in the design domain defined by the user. Then, the algorithm iteratively optimizes material distribution in order to achieve best performance for given loads and constraints. The iterative process stops when optimal distribution is achieved. The optimization algorithm may be tailored to generate the optimal topology subjected to a defined manufacturing process, such as injection molding manufacturing. For example, the optimized geometry may allow for demolding, required melted plastic flow, heat distribution, and packing. At the end, the resulting model is presented to the user with predicted performance analysis. If the result is satisfying, the model will be sent to manufacturing 412 without any additional processing required.

Thus, a cognitive system to automatically determine optimal topologies and/or materials for a proposed design, depending on available manufacturing processes has been described.

What is claimed is:

1. A system for augmenting engineering design, comprising:
    a first computer system having a processor and a memory, the memory storing processor-executable instructions, which instructions, when executed by said processor, cause said processor to perform steps including:
        receiving from a second computer system a computer-aided design (CAD) model of an article for manufacture, said article defined structurally in the CAD model;
        presenting to a user at the second computer system a graphical user interface, said graphical user interface configured to receive from the user problem definition input including a selection of a process by which said article is to be manufactured, wherein said graphical user interface comprises a plurality of interface screens configured for prompt-and-response interaction with the user, wherein the plurality of interface screens includes:
            (i) a first interface screen that prompts the user to input a selection or a definition of a material for manufacturing the article,
            (ii) a second interface screen, presented after presenting the first interface screen, that prompts the user to select of a part of the article for which topology optimization is desired, wherein the selected part is presented in a highlighted manner in the second interface screen and all other parts of the article that are not selected are presented in a ghosted manner in the second interface screen,
            (iii) a third interface screen, presented after presenting the second interface screen, that prompts the user to input a load case for the selected part,
            (iv) a fourth interface screen, presented after presenting the third interface screen, that prompts the user to input a load type for the load case,
            (v) a fifth interface screen, presented after presenting the fourth interface screen, that prompts the user to input boundary conditions for the load case, and
            (vi) a sixth interface screen, presented after presenting the fifth interface screen, that prompts the user to input one or more load locations and one or more load directions for the load case,
        executing one or more routines to iteratively optimize material distribution within said article in accordance with the selected manufacturing process, the material for manufacturing the article, and the load case for the selected part of the article; and
        presenting to the user a design CAD file describing said article in a form that has been optimized by the one or more routines,
        wherein said graphical user interface is further configured to prompt the user to specify a plurality of functionalities of said article for consideration while executing the one or more routines to iteratively optimize the material distribution within said article, and further prompt the user to rank the specified plurality of functionalities in an order of importance for said article, wherein said specified plurality of functionalities comprise considerations for optimization selected from one or more of: compliance, weighted compliance, displacements, stress, vibration mode, center of gravity, mass, volume, and volume fraction.

2. The system of claim 1, wherein said graphical user interface is configured to be presented in a web browser executing on the second computer system.

3. The system of claim 1, wherein the processor-executable instructions further cause the processor to request from the user via said graphical user interface an optimization type or target to be used when determining the optimized form.

4. The system of claim 1, wherein a plurality of screens of said graphical user interface consist of tri-panel views in which individual ones of the panels maintain consistent state throughout the problem definition by the user.

5. The system of claim 4, wherein the tri-panel views consist of a first panel for providing instructions or guides to the user, a second panel for providing a view of said article, and a third panel describing design criteria being operated upon.

6. The system of claim 1, wherein said first interface screen of the graphical user interface is configured to allow the user to input the definition of the material by material type and additional constraints including one or more of: density, yield stress, Poisson ratio, and Young's modulus.

7. The system of claim 1, wherein said graphical user interface is configured to prompt the user to specify topology optimization on a part-by-part basis for said article.

8. A method for determining optimal topologies for a proposed design of an article, the method comprising:

presenting a first interface screen of a graphical user interface that prompts a user to input a selection or a definition of a material for manufacturing the article;

after presenting the first interface screen, presenting a second interface screen of the graphical user interface that prompts the user to select a part of the article for which topology optimization is desired, wherein the selected part is presented in a highlighted manner in the second interface screen and all other parts of the article that are not selected are presented in a ghosted manner in the second interface screen;

after presenting the second interface screen, presenting a third interface screen of the graphical user interface that prompts the user to input a load case for the selected part;

after presenting the third interface screen, presenting a fourth interface screen of the graphical user interface that prompts the user to input a load type for the load case;

after presenting the fourth interface screen, presenting a fifth interface screen of the graphical user interface that prompts the user to input boundary conditions for the load case;

after presenting the fifth interface screen, presenting a sixth interface screen of the graphical user interface that prompts the user to input one or more load locations and one or more load directions for the load case;

using a computer-aided design (CAD) model of said article for manufacture, said article defined structurally in the CAD model, and a user-specified problem definition input received from the graphical user interface including a selection of a process by which said article is to be manufactured, the material for manufacturing the article, and the load case for the selected part of the article, executing one or more routines to iteratively optimize material distribution within said article in accordance with the user-specified problem definition input; and presenting to the user a design CAD file describing said article in a form that has been optimized by the one or more routines, wherein the graphical user interface is configured to also prompt the user to specify a plurality of functionalities of said article for consideration while executing the one or more routines to iteratively optimize the material distribution within said article, and further prompt the user to rank the specified plurality of functionalities in an order of importance for said article, wherein said specified plurality of functionalities comprise considerations for optimization selected from one or more of: compliance, weighted compliance, displacements, stress, vibration mode, center of gravity, mass, volume, and volume fraction.

9. The method of claim 8, wherein said graphical user interface is presented in a web browser executing on a remote computer system separate from a computer system on which the one or more routines to iteratively optimize material distribution within said article execute.

10. The method of claim 8, wherein the user-specified problem definition input includes a request to the user via said graphical user interface to specify an optimization type or target to be used when determining the optimized form.

11. The method of claim 8, wherein the user-specified problem definition input includes specification of the material for manufacturing the article by material type and additional constraints including one or more of: density, yield stress, Poisson ratio, and Young's modulus.

12. The method of claim 8, wherein the user-specified problem definition input includes specification of topology optimization on a part-by-part basis for said article.

* * * * *